(12) United States Patent
Ibrahim et al.

(10) Patent No.: US 12,425,177 B2
(45) Date of Patent: Sep. 23, 2025

(54) TECHNIQUES FOR IMPLEMENTING FULL-DUPLEX COMMUNICATIONS VIA MULTIPLE TRANSMISSION AND RECEPTION POINTS

(71) Applicant: QUALCOMM Incorporated, San Diego, CA (US)

(72) Inventors: Abdelrahman Mohamed Ahmed Mohamed Ibrahim, San Diego, CA (US); Muhammad Sayed Khairy Abdelghaffar, San Jose, CA (US); Ahmed Attia Abotabl, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 439 days.

(21) Appl. No.: 17/849,381

(22) Filed: Jun. 24, 2022

(65) Prior Publication Data
US 2023/0421341 A1 Dec. 28, 2023

(51) Int. Cl.
*H04L 5/14* (2006.01)
*H04L 1/08* (2006.01)
(Continued)

(52) U.S. Cl.
CPC ............. *H04L 5/1469* (2013.01); *H04L 1/08* (2013.01); *H04W 72/0446* (2013.01); *H04W 72/0453* (2013.01); *H04W 72/1268* (2013.01)

(58) Field of Classification Search
CPC .... H04L 5/1469; H04L 1/08; H04W 72/0446; H04W 72/0453; H04W 72/1268; H04W 72/23
(Continued)

(56) References Cited

U.S. PATENT DOCUMENTS 6,411,609 B1 * 6/2002 Emmons, Jr. .......... H04B 7/212
455/12.1
2021/0099898 A1 4/2021 You et al.
(Continued)

FOREIGN PATENT DOCUMENTS

WO WO-2017050208 A1 * 3/2017 ............. H04W 4/12
WO WO-202243742 A1 3/2022
(Continued)

OTHER PUBLICATIONS

3GPP TSG RAN WG1 #108-e Summary on [108-e-R16-UE-features-MIMO-02] R1-22-2511.
(Continued)

*Primary Examiner* — Rownak Islam
(74) *Attorney, Agent, or Firm* — Holland & Hart LLP

(57) ABSTRACT

Methods, systems, and devices for wireless communications are described. A user equipment (UE) may receive control information indicative of a set of time division duplexing (TDD) patterns. A first dedicated TDD pattern of the set of TDD patterns may be dedicated for TDD communications between the UE and a first transmission and reception point
(Continued)

(TRP) from a set of multiple TRPs associated with a network entity. The UE may determine at least a second dedicated TDD pattern for TDD communications between the UE and at least a second TRP from the set of multiple TRPs based on the set of TDD patterns. The UE may communicate with the network entity via at least one of the first TRP or the second TRP in accordance with the first dedicated TDD pattern, the second dedicated TDD pattern, or both.

30 Claims, 19 Drawing Sheets

(51) Int. Cl.
*H04W 72/0446* (2023.01)
*H04W 72/0453* (2023.01)
*H04W 72/1268* (2023.01)

(58) Field of Classification Search
USPC .......................................................... 370/329
See application file for complete search history.

(56) References Cited

U.S. PATENT DOCUMENTS

| | | | |
|---|---|---|---|
| 2021/0203469 A1 | 7/2021 | Abedini et al. | |
| 2021/0297226 A1 | 9/2021 | Abotabl et al. | |
| 2023/0133773 A1* | 5/2023 | Mansour | H04L 5/1469 370/280 |
| 2023/0163828 A1* | 5/2023 | Larsson | H04W 24/10 |
| 2023/0209514 A1* | 6/2023 | Cozzo | H04W 72/0446 370/336 |
| 2023/0328767 A1* | 10/2023 | Boudreau | H04W 72/0446 370/280 |

FOREIGN PATENT DOCUMENTS

| | | |
|---|---|---|
| WO | WO-2023053064 A1 | 4/2023 |
| WO | WO-2023116591 A1 | 6/2023 |

OTHER PUBLICATIONS

3GPP TSG RAN WG1 #104b-e—Enhancements on beam management for multi-TRP—R1-21-3507.
CMCC: "Discussion on Subband Non-overlapping Full Duplex", 3GPP TSG RAN WG1 #109-e, R1-2204304, 3rd Generation Partnership Project, Mobile Competence Centre, 650, Route Des Lucioles, F-06921 Sophia-Antipolis Cedex, France, vol. RAN WG1, No. e-Meeting, May 9, 2022-May 20, 2022, Apr. 29, 2022, 10 Pages, XP052153467, Sections 1-5, p. 2.
International Search Report and Written Opinion—PCT/US2023/067937—ISA/EPO—Sep. 21, 2023.
LG Electronics: "Remaining Details on Pusch Enhancements", 3GPP TSG RAN WG1 #109-e, R1-2204527, 3rd Generation Partnership Project, Mobile Competence Centre, 650, Route Des Lucioles, F-06921 Sophia-Antipolis Cedex, France, vol. RAN WG1, No. e-Meeting, May 9, 2022-May 20, 2022, Apr. 25, 2022, 2 Pages, XP052138102, p. 1.

* cited by examiner

Common TRP pattern 505

Dedicated TRP pattern 510-a

Dedicated TRP pattern 510-b

500

⬚ Uplink
▦ Downlink

501

Common TRP pattern 605

Dedicated TRP pattern 610-a

Dedicated TRP pattern 610-b

TECHNIQUES FOR IMPLEMENTING FULL-DUPLEX COMMUNICATIONS VIA MULTIPLE TRANSMISSION AND RECEPTION POINTS

TECHNICAL FIELD

The following relates to wireless communications, including techniques for implementing full-duplex communications via multiple transmission and reception points (mTRPs).

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

In some wireless communications, devices may be capable of performing half-duplex operations, full-duplex operations, or both. In accordance with half-duplex operations, a device may transmit or receive during a time period, but not both. In accordance with full-duplex operations, however, a device may transmit and receive simultaneously. Techniques may be implemented to configure full-duplex communications in a multiple transmission and reception point (mTRP) communications system.

SUMMARY

The described techniques relate to improved methods, systems, devices, and apparatuses that support techniques for implementing full-duplex communications via multiple transmission and reception points (mTRPs). For example, the described techniques provide for implementing full-duplex communications across mTRPs such as by configuring TDD patterns dedicated to communications between a user equipment (UE) and a TRP of a set of TRPs in a mTRP communications system. A dedicated TDD pattern (e.g., dedicated-TRP pattern, TRP-specific pattern) may indicate whether the TRP is allocated with uplink resources, or downlink resources in a set of resources allocated for full-duplex communications. Different TRPs of an mTRP system may be configured to perform different operations in the same set of full-duplex resources. Accordingly, a first TRP may be configured to transmit to a UE in a full-duplex slot and a second TRP may be configured to receive from the UE, or a different device, in the full-duplex slot. For example, a UE may receive control information (e.g., a downlink control information message, a radio resource control (RRC) message) indicative of a set of time division duplexing (TDD) patterns. A first dedicated TDD pattern of the set of TDD patterns may be dedicated for TDD communications between the UE and a first TRP from a set of multiple TRPs associated with a network entity. The UE may determine at least a second dedicated TDD pattern for TDD communications between the UE and at least a second TRP from the set of multiple TRPs based on the set of TDD patterns. In some cases, the UE may determine the second dedicated TDD pattern based on the second dedicated TDD pattern being included in the control information. In some cases, the UE may deduce the second dedicated TDD pattern based on a common TDD pattern associated with the network entity (e.g., a common TRP pattern) and the first dedicated TDD pattern. The UE may communicate with the network entity via at least one of the first TRP or the second TRP in accordance with the first dedicated TDD pattern, the second dedicated TDD pattern, or both. In some cases, the UE may adjust transmission parameters corresponding to a particular TRP in accordance with the TRP-specific TDD patterns (e.g., dedicated TDD patterns).

Additionally, or alternatively, the UE may receive a frequency configuration for mTRP communications. For example, the UE may receive an indication whether communications with two different TRPs within a slot will fully-overlap (e.g., in-band FD (IBFD)), partially overlap (e.g., partial IBFD), or do not overlap in frequency (e.g., sub-band full-duplex) and in some cases, may indicate how the frequency resources are divided (e.g., split) between the first and second TRPs. The UE may communicate with the network entity via at least one of the first TRP or the second TRP in accordance the frequency configuration.

A method for wireless communications at a UE is described. The method may include receiving control information indicative of a set of multiple TDD patterns, where a first dedicated TDD pattern of the set of multiple TDD patterns is for TDD communications between the UE and a first TRP from a set of mTRPs associated with a network entity, determining at least a second dedicated TDD pattern for TDD communications between the UE and at least a second TRP from the set of mTRPs based on the set of multiple TDD patterns, and communicating with the network entity via at least one of the first TRP or the second TRP in accordance with the first dedicated TDD pattern, the second dedicated TDD pattern, or both.

An apparatus for wireless communications at a UE is described. The apparatus may include at least one processor, and memory coupled with the at least one processor. The memory may store instructions executable by the at least one processor to cause the UE to receive control information indicative of a set of multiple TDD patterns, where a first dedicated TDD pattern of the set of multiple TDD patterns is for TDD communications between the UE and a first TRP from a set of mTRPs associated with a network entity, determine at least a second dedicated TDD pattern for TDD communications between the UE and at least a second TRP from the set of mTRPs based on the set of multiple TDD patterns, and communicate with the network entity via at least one of the first TRP or the second TRP in accordance with the first dedicated TDD pattern, the second dedicated TDD pattern, or both.

Another apparatus for wireless communications at a UE is described. The apparatus may include means for receiving control information indicative of a set of multiple TDD patterns, where a first dedicated TDD pattern of the set of multiple TDD patterns is for TDD communications between the UE and a first TRP from a set of mTRPs associated with a network entity, means for determining at least a second dedicated TDD pattern for TDD communications between the UE and at least a second TRP from the set of mTRPs based on the set of multiple TDD patterns, and means for communicating with the network entity via at least one of the first TRP or the second TRP in accordance with the first dedicated TDD pattern, the second dedicated TDD pattern, or both.

A non-transitory computer-readable medium storing code for wireless communications at a UE is described. The code may include instructions executable by at least one processor to receive control information indicative of a set of multiple TDD patterns, where a first dedicated TDD pattern of the set of multiple TDD patterns is for TDD communications between the UE and a first TRP from a set of mTRPs associated with a network entity, determine at least a second dedicated TDD pattern for TDD communications between the UE and at least a second TRP from the set of mTRPs based on the set of multiple TDD patterns, and communicate with the network entity via at least one of the first TRP or the second TRP in accordance with the first dedicated TDD pattern, the second dedicated TDD pattern, or both.

Some examples of the method, apparatuses, and non-transitory computer-readable medium described herein may further include operations, features, means, or instructions for receiving additional control information indicative of an allocation of frequency resources for one or more slots and determining one or more frequency-specific TDD patterns for the communicating with the network entity, where the one or more frequency-specific TDD patterns may be based on the additional control information and at least one of the first dedicated TDD pattern or the second dedicated TDD pattern.

In some examples of the method, apparatuses, and non-transitory computer-readable medium described herein, the additional control information may be indicative of whether a slot may be configured for half-duplex communications, full duplex communications in which mTRPs may be allocated a same set of frequency resources, sub-band full duplex communications, or whether there may be partial overlap of uplink resources and downlink resources in an in-band full-duplex slot.

In some examples of the method, apparatuses, and non-transitory computer-readable medium described herein, the additional control information indicates a first allocation of frequency resources from a set of allocations of frequency resources.

In some examples of the method, apparatuses, and non-transitory computer-readable medium described herein, communicating with the network entity may include operations, features, means, or instructions for receiving one or more first messages from the first TRP in a full-duplex slot in accordance with the first dedicated TDD pattern and transmitting, simultaneously with receiving the one or more first messages, one or more second messages to the second TRP in the full-duplex slot in accordance with the second dedicated TDD pattern.

Some examples of the method, apparatuses, and non-transitory computer-readable medium described herein may further include operations, features, means, or instructions for identifying a first set of communication parameters associated with the first dedicated TDD pattern and a second set of communication parameters associated with the second dedicated TDD pattern and communicating via the first TRP and the second TRP by switching between the first set of communication parameters and the second set of communication parameters in accordance with the respective first dedicated TDD pattern and the second dedicated TDD pattern.

In some examples of the method, apparatuses, and non-transitory computer-readable medium described herein, the first set of communication parameters and the second set of communication parameters each include a transmission configuration indicator state, a control resource set pool index, one or more beam control parameters, one or more power control parameters, one or more timing advance parameters, or a combination thereof.

Some examples of the method, apparatuses, and non-transitory computer-readable medium described herein may further include operations, features, means, or instructions for receiving an indication of an uplink repetition sequence associated with the first TRP and the second TRP, where communicating with the network entity may be based on the uplink repetition sequence.

Some examples of the method, apparatuses, and non-transitory computer-readable medium described herein may further include operations, features, means, or instructions for identifying that the uplink repetition sequence aligns with the first dedicated TDD pattern and the second dedicated TDD pattern, where the UE communicates with the network entity in accordance with the uplink repetition sequence, the first dedicated TDD pattern, and the second dedicated TDD pattern.

Some examples of the method, apparatuses, and non-transitory computer-readable medium described herein may further include operations, features, means, or instructions for identifying that one or more repetitions of the uplink repetition sequence fail to align with the first dedicated TDD pattern, the second dedicated TDD pattern, or both.

Some examples of the method, apparatuses, and non-transitory computer-readable medium described herein may further include operations, features, means, or instructions for refraining to transmit the one or more repetitions of the uplink repetition sequence based on the one or more repetitions failing to align with the first dedicated TDD pattern, the second dedicated TDD pattern, or both.

Some examples of the method, apparatuses, and non-transitory computer-readable medium described herein may further include operations, features, means, or instructions for transmitting the one or more repetitions of the uplink repetition sequence irrespective of the one or more repetitions failing to align with the first dedicated TDD pattern, the second dedicated TDD pattern, or both.

In some examples of the method, apparatuses, and non-transitory computer-readable medium described herein, the uplink repetition sequence indicates a number of repetitions of an uplink message in accordance with a cyclic mapping, or a sequential mapping and repetitions of the uplink repetition sequence alternate between the first TRP and the second TRP.

Some examples of the method, apparatuses, and non-transitory computer-readable medium described herein may further include operations, features, means, or instructions for performing slot counting for the first TRP, the second TRP, or both based on a common TDD pattern of the set of multiple TDD patterns for TDD communications associated with the network entity.

Some examples of the method, apparatuses, and non-transitory computer-readable medium described herein may further include operations, features, means, or instructions for identifying a scheduling conflict between one or more scheduled messages and the first dedicated TDD pattern based on the slot counting.

Some examples of the method, apparatuses, and non-transitory computer-readable medium described herein may further include operations, features, means, or instructions for refraining to transmit the one or more scheduled messages based on the scheduling conflict.

Some examples of the method, apparatuses, and non-transitory computer-readable medium described herein may further include operations, features, means, or instructions for transmitting the one or more scheduled messages irrespective of the scheduling conflict.

Some examples of the method, apparatuses, and non-transitory computer-readable medium described herein may further include operations, features, means, or instructions for performing slot counting for the first TRP, the second TRP, or both based on a respective dedicated TDD patterns associated with each of the first and second TRPs.

In some examples of the method, apparatuses, and non-transitory computer-readable medium described herein, the set of multiple TDD patterns includes the second dedicated TDD pattern for communications between the UE and at least the second TRP and determining at least the second dedicated TDD pattern may be based on receiving the control information indicative of the second dedicated TDD pattern.

In some examples of the method, apparatuses, and non-transitory computer-readable medium described herein, the set of multiple TDD patterns includes a common TDD pattern for TDD communications associated with the network entity.

In some examples of the method, apparatuses, and non-transitory computer-readable medium described herein, determining the second dedicated TDD pattern may include operations, features, means, or instructions for determining the second dedicated TDD pattern based on the first dedicated TDD pattern and the common TDD pattern.

In some examples of the method, apparatuses, and non-transitory computer-readable medium described herein, each TDD pattern of the set of multiple TDD patterns includes one or more full-duplexing slots, one or more half-duplexing slots, or a both.

In some examples of the method, apparatuses, and non-transitory computer-readable medium described herein, communicating with the network entity may include operations, features, means, or instructions for receiving one or more messages from the first TRP, the second TRP, or both in a half-duplex downlink slot, or a full-duplex slot in accordance with the set of multiple TDD patterns.

In some examples of the method, apparatuses, and non-transitory computer-readable medium described herein, communicating with the network entity may include operations, features, means, or instructions for transmitting one or more messages to the first TRP, the second TRP, or both in a half-duplex uplink slot, or a full-duplex slot in accordance with the set of multiple TDD patterns.

Some examples of the method, apparatuses, and non-transitory computer-readable medium described herein may further include operations, features, means, or instructions for receiving a first downlink control information message indicative of scheduling information for the first TRP and receiving a second downlink control information message indicative of scheduling information for the second TRP, where communicating with the network entity may be based on receiving the first downlink control information message and the second downlink control information message.

Some examples of the method, apparatuses, and non-transitory computer-readable medium described herein may further include operations, features, means, or instructions for receiving a single downlink control information message indicative of scheduling information for the first TRP and the second TRP, where communicating with the network entity may be based on receiving the single downlink control information message.

A method for wireless communications at a network entity is described. The method may include identifying at least a first dedicated TDD pattern for TDD communications between a UE and a first TRP from a set of mTRPs associated with the network entity and a second dedicated TDD pattern for TDD communications between the UE and a second TRP from the set of mTRPs associated with the network entity, transmitting control information indicative of a set of multiple TDD patterns, where the set of multiple TDD patterns includes at least the first dedicated TDD pattern, and communicating with the UE via at least one of the first TRP or the second TRP in accordance with the first dedicated TDD pattern, the second dedicated TDD pattern, or both.

An apparatus for wireless communications at a network entity is described. The apparatus may include at least one processor, and memory coupled with the at least one processor. The memory may store instructions executable by the at least one processor to cause the network entity to identify at least a first dedicated TDD pattern for TDD communications between a UE and a first TRP from a set of mTRPs associated with the network entity and a second dedicated TDD pattern for TDD communications between the UE and a second TRP from the set of mTRPs associated with the network entity, transmit control information indicative of a set of multiple TDD patterns, where the set of multiple TDD patterns includes at least the first dedicated TDD pattern, and communicate with the UE via at least one of the first TRP or the second TRP in accordance with the first dedicated TDD pattern, the second dedicated TDD pattern, or both.

Another apparatus for wireless communications at a network entity is described. The apparatus may include means for identifying at least a first dedicated TDD pattern for TDD communications between a UE and a first TRP from a set of mTRPs associated with the network entity and a second dedicated TDD pattern for TDD communications between the UE and a second TRP from the set of mTRPs associated with the network entity, means for transmitting control information indicative of a set of multiple TDD patterns, where the set of multiple TDD patterns includes at least the first dedicated TDD pattern, and means for communicating with the UE via at least one of the first TRP or the second TRP in accordance with the first dedicated TDD pattern, the second dedicated TDD pattern, or both.

A non-transitory computer-readable medium storing code for wireless communications at a network entity is described. The code may include instructions executable by at least one processor to identify at least a first dedicated TDD pattern for TDD communications between a UE and a first TRP from a set of mTRPs associated with the network entity and a second dedicated TDD pattern for TDD communications between the UE and a second TRP from the set of mTRPs associated with the network entity, transmit control information indicative of a set of multiple TDD patterns, where the set of multiple TDD patterns includes at least the first dedicated TDD pattern, and communicate with the UE via at least one of the first TRP or the second TRP in accordance with the first dedicated TDD pattern, the second dedicated TDD pattern, or both.

Some examples of the method, apparatuses, and non-transitory computer-readable medium described herein may further include operations, features, means, or instructions for transmitting additional control information indicative of an allocation of frequency resources for one or more slots and determining one or more frequency-specific TDD patterns for the communicating with the UE, where the one or more frequency-specific TDD patterns may be based on the additional control information and at least one of the first dedicated TDD pattern or the second dedicated TDD pattern.

In some examples of the method, apparatuses, and non-transitory computer-readable medium described herein, the additional control information may be indicative of whether a slot may be configured for half-duplex communications, full duplex communications in which mTRPs may be allocated a same set of frequency resources, sub-band full duplex communications, or whether there may be partial overlap of uplink resources and downlink resources in an in-band full-duplex slot.

In some examples of the method, apparatuses, and non-transitory computer-readable medium described herein, the additional control information indicates a first allocation of frequency resources from a set of allocations of frequency resources.

In some examples of the method, apparatuses, and non-transitory computer-readable medium described herein, communicating with the UE may include operations, features, means, or instructions for transmitting one or more first messages via the first TRP in a full-duplex slot in accordance with the first dedicated TDD pattern and receiving, simultaneously to transmitting the one or more first messages, one or more second messages via the second TRP in the full-duplex slot in accordance with the second dedicated TDD pattern.

Some examples of the method, apparatuses, and non-transitory computer-readable medium described herein may further include operations, features, means, or instructions for transmitting an indication of a scheduled message, an uplink repetition sequence, or both associated with the first TRP and the second TRP, where communicating with the UE may be based on the uplink repetition sequence.

Some examples of the method, apparatuses, and non-transitory computer-readable medium described herein may further include operations, features, means, or instructions for configuring the scheduled message, the uplink repetition sequence, or both such that the scheduled message, the uplink repetition sequence, or both aligns with the first dedicated TDD pattern and the second dedicated TDD pattern.

Some examples of the method, apparatuses, and non-transitory computer-readable medium described herein may further include operations, features, means, or instructions for identifying a failure to receive the scheduled message, one or more repetitions of the uplink repetition sequence, or both, where the failure may be based on the scheduled message, the one or more repetitions of the uplink repetition sequence, or both failing to align with the first dedicated TDD pattern, the second dedicated TDD pattern, or both.

Some examples of the method, apparatuses, and non-transitory computer-readable medium described herein may further include operations, features, means, or instructions for receiving the scheduled message, a set of repetitions in accordance with the uplink repetition sequence, or both, where the scheduled message, one or more repetitions of the set of repetitions, or both fail to align with the first dedicated TDD pattern, the second dedicated TDD pattern, or both.

In some examples of the method, apparatuses, and non-transitory computer-readable medium described herein, the uplink repetition sequence indicates a number of repetitions of an uplink message in accordance with a cyclic mapping, or a sequential mapping and repetitions of the uplink repetition sequence alternate between the first TRP and the second TRP.

In some examples of the method, apparatuses, and non-transitory computer-readable medium described herein, the set of multiple TDD patterns includes the second dedicated TDD pattern for communications between the UE and at least the second TRP.

In some examples of the method, apparatuses, and non-transitory computer-readable medium described herein, the set of multiple TDD patterns includes a common TDD pattern for TDD communications associated with the network entity.

In some examples of the method, apparatuses, and non-transitory computer-readable medium described herein, each TDD pattern of the set of multiple TDD patterns includes one or more full-duplexing slots, one or more half-duplexing slots, or a both.

In some examples of the method, apparatuses, and non-transitory computer-readable medium described herein, communicating with the UE may include operations, features, means, or instructions for transmitting one or more messages via the first TRP, the second TRP, or both in a half-duplex downlink slot, or a full-duplex slot in accordance with the set of multiple TDD patterns.

In some examples of the method, apparatuses, and non-transitory computer-readable medium described herein, communicating with the UE may include operations, features, means, or instructions for receiving one or more messages via the first TRP, the second TRP, or both in a half-duplex uplink slot, or a full-duplex slot in accordance with the set of multiple TDD patterns.

Some examples of the method, apparatuses, and non-transitory computer-readable medium described herein may further include operations, features, means, or instructions for transmitting a first downlink control information message indicative of scheduling information for the first TRP and transmitting a second downlink control information message indicative of scheduling information for the second TRP, where communicating with the UE may be based on transmitting the first downlink control information message and the second downlink control information message.

Some examples of the method, apparatuses, and non-transitory computer-readable medium described herein may further include operations, features, means, or instructions for transmitting a single downlink control information message indicative of scheduling information for the first TRP and the second TRP, where communicating with the UE may be based on transmitting the single downlink control information message.

DETAILED DESCRIPTION

Figure 1:
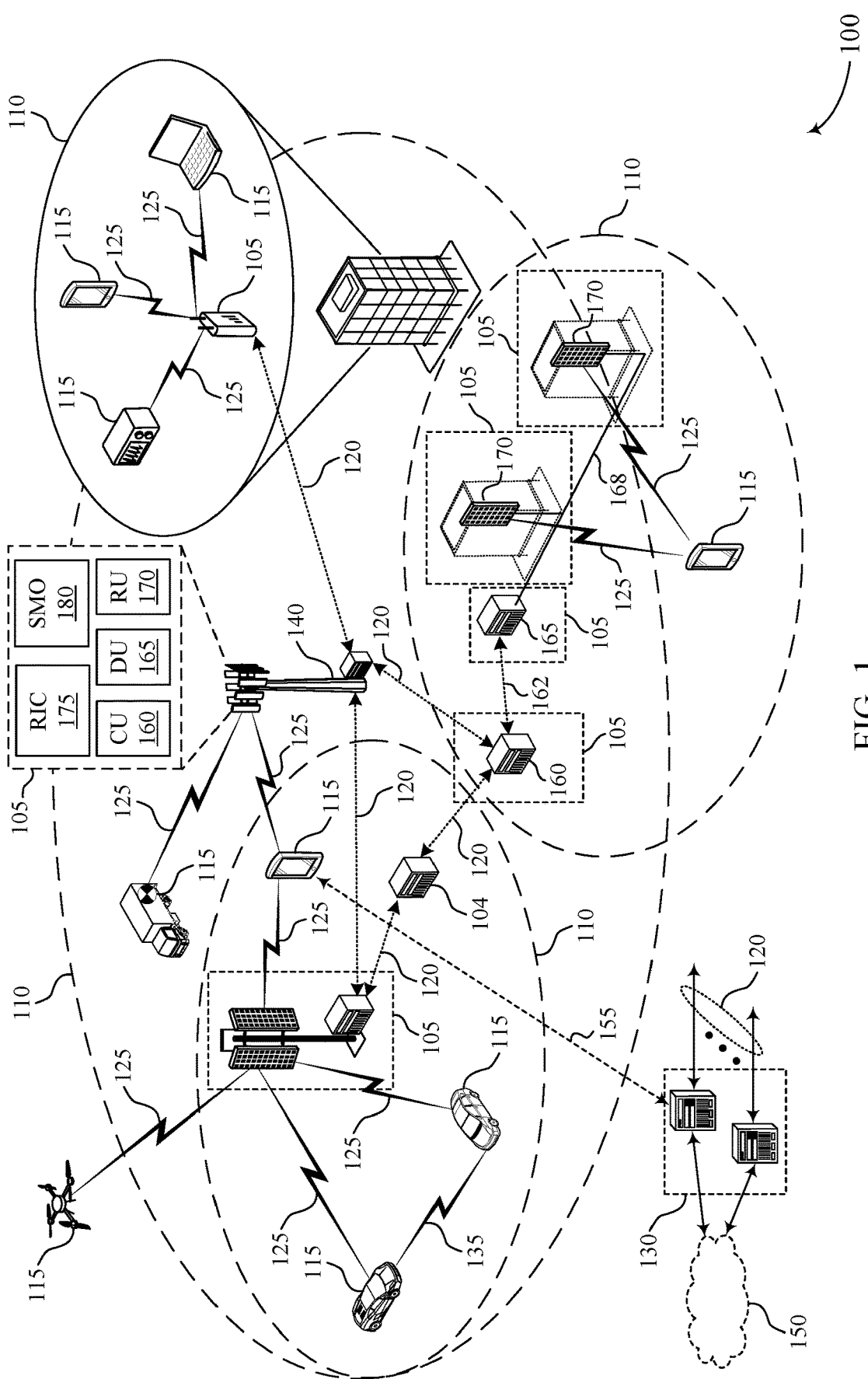
FIG. 1 illustrates an example of a wireless communications system that supports techniques for implementing full-duplex communications via multiple transmission and reception points (mTRPs) in accordance with one or more aspects of the present disclosure.

In some wireless communications systems, devices (e.g., network entities, user equipment's (UEs), network nodes, transmission and reception points (TRPs)) may be capable of performing half-duplex operations, full-duplex operations, or both. In accordance with half-duplex operations, a device may transmit or receive during a time period, but not both. In accordance with full-duplex operations (e.g., in-band full duplex (IBFD), sub-band full duplex (SBFD), however, a device may transmit and receive simultaneously in the same, partially overlapping, or different frequency resources. In some cases, the device may be configured with resources in which the device may perform half-duplex operations, or full-duplex operations. For example, the device may receive a slot configuration indicating one or more slots that are allocated for uplink communications, one or more slots that are allocated for downlink communications, one or more slots allocated for full-duplex (e.g., uplink and downlink communications), one or more slots that may be flexibly configured (e.g., flexible slots), or a combination thereof.

However, a device that performs full-duplex communications may experience self-interference in which signals transmitted and received simultaneously at the device may cause interference with one other. In some cases, a UE, or some other device may communicate with TRPs in a multiple-TRP (mTRP) system, such that the UE may communicate with a network entity via a first TRP, and a second TRP. It may be beneficial to implement mTRPs to support full duplex communications, such that a first TRP may transmit to and a second TRP may receive from the same or different UEs in overlapping resources. Accordingly, a network entity associated with the first and second TRP may perform full-duplex operations via the first and second TRPs while mitigating self-interference at the network entity. In some cases, a UE may be configured with per-cell time division duplexing (TDD) patterns that indicate half-duplex downlink and uplink slots, full-duplex slots, or both allocated for the cell (e.g., the network entity). Enabling full-duplex operations across mTRPs while a UE is configured with per-cell TDD patterns may lead to inefficient operations as the UE may not be able to identify how a full-duplex slot is allocated to different TRPs involved in the FD operations. Accordingly, techniques for implementing full duplex communications via mTRPs may be improved.

To enable efficient full duplex operations across mTRPs, a UE may be configured with a set of TDD patterns. In some cases, the set of TDD patterns may include at least one TDD pattern specific to communications between the UE and a first TRP. Additionally, the set of TDD patterns may include a cell-common TDD pattern, a TDD pattern specific to communications between the UE and a second TRP, or both. The UE may then determine the TRP-specific TDD patterns for the first TRP and the second TRP based on the set of TDD patterns. The UE may communicate with the first and second TRPs in accordance with the TRP-specific patterns, where in some cases, the UE may transmit to one TRP and receive from another TRP in overlapping resources. In some cases, the UE may also receive a frequency configuration. For example, the UE may receive an indication whether communications with two different TRPs within a slot will fully-overlap (e.g., in-band FD (IBFD)), partially overlap (e.g., partial IBFD), or not overlap in frequency (e.g., sub-band full-duplex) and in some cases, may indicate how the frequency resources are divided between the first and second TRPs. In some cases, the UE may be configured to perform the full duplex operation across mTRPs in accordance with scheduling received via a single downlink control information (DCI) or via multiple DCIs (e.g., one per TRP). In some cases, the UE may adjust transmission parameters corresponding to a particular TRP in accordance with the TRP-specific TDD patterns, frequency configurations, or both.

Particular aspects of the subject matter described herein may be implemented to realize one or more advantages. The described techniques may support improvements in implementing full-duplex communications by decreasing signaling overhead, reducing self-interference, improving reliability, and decreasing latency, among other advantages. As such, supported techniques may include improved network operations and, in some examples, may promote network efficiencies, among other benefits.

Aspects of the disclosure are initially described in the context of wireless communications systems. Aspects of the disclosure are further illustrated by and described with reference to communication configurations, and a process flow. Aspects of the disclosure are further illustrated by and described with reference to apparatus diagrams, system diagrams, and flowcharts that relate to techniques for implementing full-duplex communications via mTRPs.

FIG. 1 illustrates an example of a wireless communications system 100 that supports techniques for implementing full-duplex communications via mTRPs in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending upon which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2))

functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support techniques for implementing full-duplex communications via mTRPs as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a multimedia/entertainment device (e.g., a radio, a MP3 player, or a video device), a camera, a gaming device, a navigation/positioning device (e.g., GNSS (global navigation satellite system) devices based on, for example, GPS (global positioning system), Beidou, GLONASS, or Galileo, or a terrestrial-based device), a tablet computer, a laptop computer, or a personal computer, a netbook, a smartbook, a personal computer, a smart device, a wearable device (e.g., a smart watch, smart clothing, smart glasses, virtual reality goggles, a smart wristband, smart jewelry (e.g., a smart ring, a smart bracelet)), a drone, a robot/robotic device, a vehicle, a vehicular device, a meter (e.g., parking meter, electric meter, gas meter, water meter), a monitor, a gas pump, an appliance (e.g., kitchen appliance, washing machine, dryer), a location tag, a medical/healthcare device, an implant, a sensor/actuator, a display, or any other suitable device configured to communicate via a wireless or wired medium. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and TDD component carriers.

Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by)

the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

Techniques for implementing full duplex communications via mTRPs may be improved. For example, TRPs of an mTRP system may be assumed to all be in a transmitting mode or a receiving mode at a time. Additionally, a single TDD pattern may be configured for the mTRPs (e.g., a non-TRP specific pattern, a common TDD pattern). Accordingly, a transmitting/receiving mode switching instance for a TRP may be unknown until all scheduling decisions have been made which may incur tight delay requirements to achieve ideal-backhaul for mTRPs. Additionally, scheduling decisions may be dynamic and a non-TRP specific TDD pattern may not specify transmitting or receiving modes for a particular TRP. In particular, in full-duplex slots, additional processing may be implemented at a receiving device to reduce impact of self-interference (e.g., activation of reception nulling, additional filtering). However, the receiving device may be unable to perform such additional processing if the receiving device is unaware of the mode of the TRP. In some cases, increased signaling may be implemented to indicate such dynamic transmitting/receiving mode switching based on scheduling information. However, as the mode switching may be dynamic, the signaling may need to be transmitted continuously thereby increasing overhead.

In another example, a UE 115, or some other device communicating with the mTRPs, may not be able to use different uplink transmission parameters (e.g., power control, timing advance, TCI state) for each TRP if the UE 115 is configured with only the non-TRP specific TDD pattern. For configured uplink transmissions (e.g., a configured grant, semi-persistent or persistent CSI feedback), a UE 115 may need to receive additional signaling including additional channel configurations (e.g., RRC configurations) to account for TRP-specific transmission parameters (e.g., a first CG-PUSCH configuration with power control parameter for a first TRP and a second CG-PUSCH configuration for a second TRP). Additionally, or alternatively, a UE 115 may make frequent TCI state changes to switch transmitting beams between two TRPs and may need multiple configurations of SRS sets, such as one for each TRP.

Generally, the described techniques provide for implementing full-duplex communications across mTRPs such as by configuring TDD patterns dedicated to communications between a UE 115 and a TRP of a set of TRPs in a mTRP communications system (e.g., such as wireless communications system 100). In particular, a dedicated TDD pattern may indicate whether a TRP is allocated with uplink resources, or downlink resources in a set of resources allocated for full-duplex communications (e.g., a full-duplex slot). Different TRPs of an mTRP system may be configured to perform different operations in the same set of full-duplex resources. For example, a first TRP may be configured to transmit to a UE 115 in a full-duplex slot and a second TRP may be configured to receive from the UE 115, or a different device, in the full-duplex slot. A UE 115 may receive control information (e.g., a downlink control information message, a radio resource control (RRC) message) indicative of a set of TDD patterns. A first dedicated TDD pattern of the set of TDD patterns may be dedicated for TDD communications between the UE 115 and a first TRP from a set of multiple TRPs associated with a network entity 105. The UE 115 may determine at least a second dedicated TDD pattern for TDD communications between the UE 115 and at least a second TRP from the set of multiple TRPs based on the set of TDD patterns. In some cases, the UE 115 may determine the second dedicated TDD pattern based on the second dedicated TDD pattern being included in the control information. In some cases, the UE 115 may deduce the second dedicated TDD pattern based on a common TDD pattern associated with the network entity 105 and the first dedicated TDD pattern. The UE 115 may communicate with the network entity 105 via at least one of the first TRP or the second TRP in accordance with the first dedicated TDD pattern, the second dedicated TDD pattern, or both. In some cases, the UE 115 may adjust transmission parameters corresponding to a particular TRP in accordance with the TRP-specific TDD patterns (e.g., dedicated TDD patterns).

Additionally, or alternatively, the UE 115 may receive a frequency configuration for mTRP communications. For example, the UE 115 may receive an indication whether communications with two different TRPs within a slot will fully-overlap (e.g., in-band FD (IBFD)), partially overlap (e.g., partial IBFD), or not overlap in frequency (e.g., sub-band full-duplex) and in some cases, may indicate how the frequency resources are divided between the first and second TRPs. The UE 115 may communicate with the network entity 105 via at least one of the first TRP or the second TRP in accordance the frequency configurations.

By implementing TRP-specific configurations to at least enable full duplex communications in at least mTRP systems, transmitting and switching instances may be identifiable in advance based on TRP-specific patterns which may result in less signaling overhead for indicating transmitting and receiving modes of each TRP. Additionally, fields implemented for mTRP uplink repetitions (e.g., PUSCH repetitions, PUCCH repetitions) may be reused. For example, UE 115 may switch between two configured power control parameters based on TRP-specific patterns, such as for transmissions without repetitions.

Figure 2:
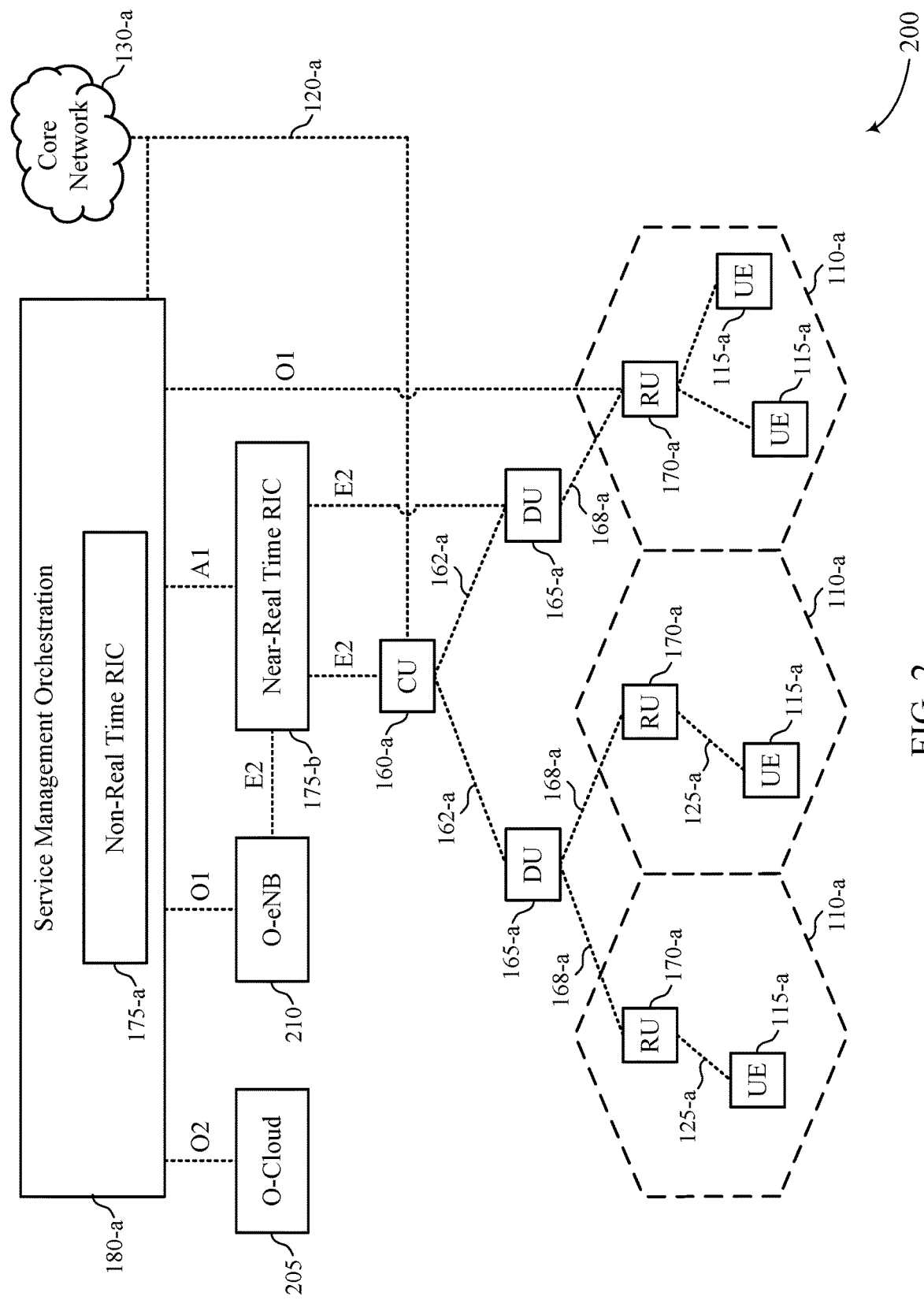
FIG. 2 illustrates an example of a network architecture that supports techniques for implementing full-duplex communications via mTRPs in accordance with one or more aspects of the present disclosure.

FIG. 2 illustrates an example of a network architecture 200 (e.g., a disaggregated base station architecture, a disaggregated RAN architecture) that supports techniques for implementing full-duplex communications via mTRPs in accordance with one or more aspects of the present disclosure. The network architecture 200 may illustrate an example for implementing one or more aspects of the wireless communications system 100. The network architecture 200 may include one or more CUs 160-a that may communicate directly with a core network 130-a via a backhaul communication link 120-a, or indirectly with the core network 130-a through one or more disaggregated network entities 105 (e.g., a Near-RT RIC 175-b via an E2 link, or a Non-RT RIC 175-a associated with an SMO 180-a (e.g., an SMO Framework), or both). A CU 160-a may communicate with one or more DUs 165-a via respective midhaul communication links 162-a (e.g., an F1 interface). The DUs 165-a may communicate with one or more RUs 170-a via respective fronthaul communication links 168-a. The RUs 170-a may be associated with respective coverage areas 110-a and may communicate with UEs 115-a via one or more communication links 125-a. In some implementations, a UE 115-a may be simultaneously served by multiple RUs 170-a.

Each of the network entities 105 of the network architecture 200 (e.g., CUs 160-a, DUs 165-a, RUs 170-a, Non-RT RICs 175-a, Near-RT RICs 175-b, SMOs 180-a, Open Clouds (O-Clouds) 205, Open eNBs (O-eNBs) 210) may include one or more interfaces or may be coupled with one or more interfaces configured to receive or transmit signals (e.g., data, information) via a wired or wireless transmission medium. Each network entity 105, or an associated processor (e.g., controller) providing instructions to an interface of the network entity 105, may be configured to communicate with one or more of the other network entities 105 via the transmission medium. For example, the network entities 105 may include a wired interface configured to receive or transmit signals over a wired transmission medium to one or more of the other network entities 105. Additionally, or alternatively, the network entities 105 may include a wireless interface, which may include a receiver, a transmitter, or transceiver (e.g., an RF transceiver) configured to receive or transmit signals, or both, over a wireless transmission medium to one or more of the other network entities 105.

In some examples, a CU 160-a may host one or more higher layer control functions. Such control functions may include RRC, PDCP, SDAP, or the like. Each control function may be implemented with an interface configured to communicate signals with other control functions hosted by the CU 160-a. A CU 160-a may be configured to handle user plane functionality (e.g., CU-UP), control plane functionality (e.g., CU-CP), or a combination thereof. In some examples, a CU 160-a may be logically split into one or more CU-UP units and one or more CU-CP units. A CU-UP unit may communicate bidirectionally with the CU-CP unit via an interface, such as an E1 interface when implemented in an O-RAN configuration. A CU 160-a may be implemented to communicate with a DU 165-a, as necessary, for network control and signaling.

A DU 165-a may correspond to a logical unit that includes one or more functions (e.g., base station functions, RAN functions) to control the operation of one or more RUs 170-*a*. In some examples, a DU 165-*a* may host, at least partially, one or more of an RLC layer, a MAC layer, and one or more aspects of a PHY layer (e.g., a high PHY layer, such as modules for FEC encoding and decoding, scrambling, modulation and demodulation, or the like) depending, at least in part, on a functional split, such as those defined by the 3rd Generation Partnership Project (3GPP). In some examples, a DU 165-*a* may further host one or more low PHY layers. Each layer may be implemented with an interface configured to communicate signals with other layers hosted by the DU 165-*a*, or with control functions hosted by a CU 160-*a*.

In some examples, lower-layer functionality may be implemented by one or more RUs 170-*a*. For example, an RU 170-*a*, controlled by a DU 165-*a*, may correspond to a logical node that hosts RF processing functions, or low-PHY layer functions (e.g., performing fast Fourier transform (FFT), inverse FFT (iFFT), digital beamforming, physical random access channel (PRACH) extraction and filtering, or the like), or both, based at least in part on the functional split, such as a lower-layer functional split. In such an architecture, an RU 170-*a* may be implemented to handle over the air (OTA) communication with one or more UEs 115-*a*. In some implementations, real-time and non-real-time aspects of control and user plane communication with the RU(s) 170-*a* may be controlled by the corresponding DU 165-*a*. In some examples, such a configuration may enable a DU 165-*a* and a CU 160-*a* to be implemented in a cloud-based RAN architecture, such as a vRAN architecture.

The SMO 180-*a* may be configured to support RAN deployment and provisioning of non-virtualized and virtualized network entities 105. For non-virtualized network entities 105, the SMO 180-*a* may be configured to support the deployment of dedicated physical resources for RAN coverage requirements which may be managed via an operations and maintenance interface (e.g., an O1 interface). For virtualized network entities 105, the SMO 180-*a* may be configured to interact with a cloud computing platform (e.g., an O-Cloud 205) to perform network entity life cycle management (e.g., to instantiate virtualized network entities 105) via a cloud computing platform interface (e.g., an O2 interface). Such virtualized network entities 105 can include, but are not limited to, CUs 160-*a*, DUs 165-*a*, RUs 170-*a*, and Near-RT RICs 175-*b*. In some implementations, the SMO 180-*a* may communicate with components configured in accordance with a 4G RAN (e.g., via an O1 interface). Additionally, or alternatively, in some implementations, the SMO 180-*a* may communicate directly with one or more RUs 170-*a* via an O1 interface. The SMO 180-*a* also may include a Non-RT RIC 175-*a* configured to support functionality of the SMO 180-*a*.

The Non-RT RIC 175-*a* may be configured to include a logical function that enables non-real-time control and optimization of RAN elements and resources, Artificial Intelligence (AI) or Machine Learning (ML) workflows including model training and updates, or policy-based guidance of applications/features in the Near-RT RIC 175-*b*. The Non-RT RIC 175-*a* may be coupled to or communicate with (e.g., via an A1 interface) the Near-RT RIC 175-*b*. The Near-RT RIC 175-*b* may be configured to include a logical function that enables near-real-time control and optimization of RAN elements and resources via data collection and actions over an interface (e.g., via an E2 interface) connecting one or more CUs 160-*a*, one or more DUs 165-*a*, or both, as well as an O-eNB 210, with the Near-RT RIC 175-*b*.

In some examples, to generate AI/ML models to be deployed in the Near-RT RIC 175-*b*, the Non-RT RIC 175-*a* may receive parameters or external enrichment information from external servers. Such information may be utilized by the Near-RT RIC 175-*b* and may be received at the SMO 180-*a* or the Non-RT RIC 175-*a* from non-network data sources or from network functions. In some examples, the Non-RT RIC 175-*a* or the Near-RT RIC 175-*b* may be configured to tune RAN behavior or performance. For example, the Non-RT RIC 175-*a* may monitor long-term trends and patterns for performance and employ AI or ML models to perform corrective actions through the SMO 180-*a* (e.g., reconfiguration via O1) or via generation of RAN management policies (e.g., A1 policies).

Figure 3:
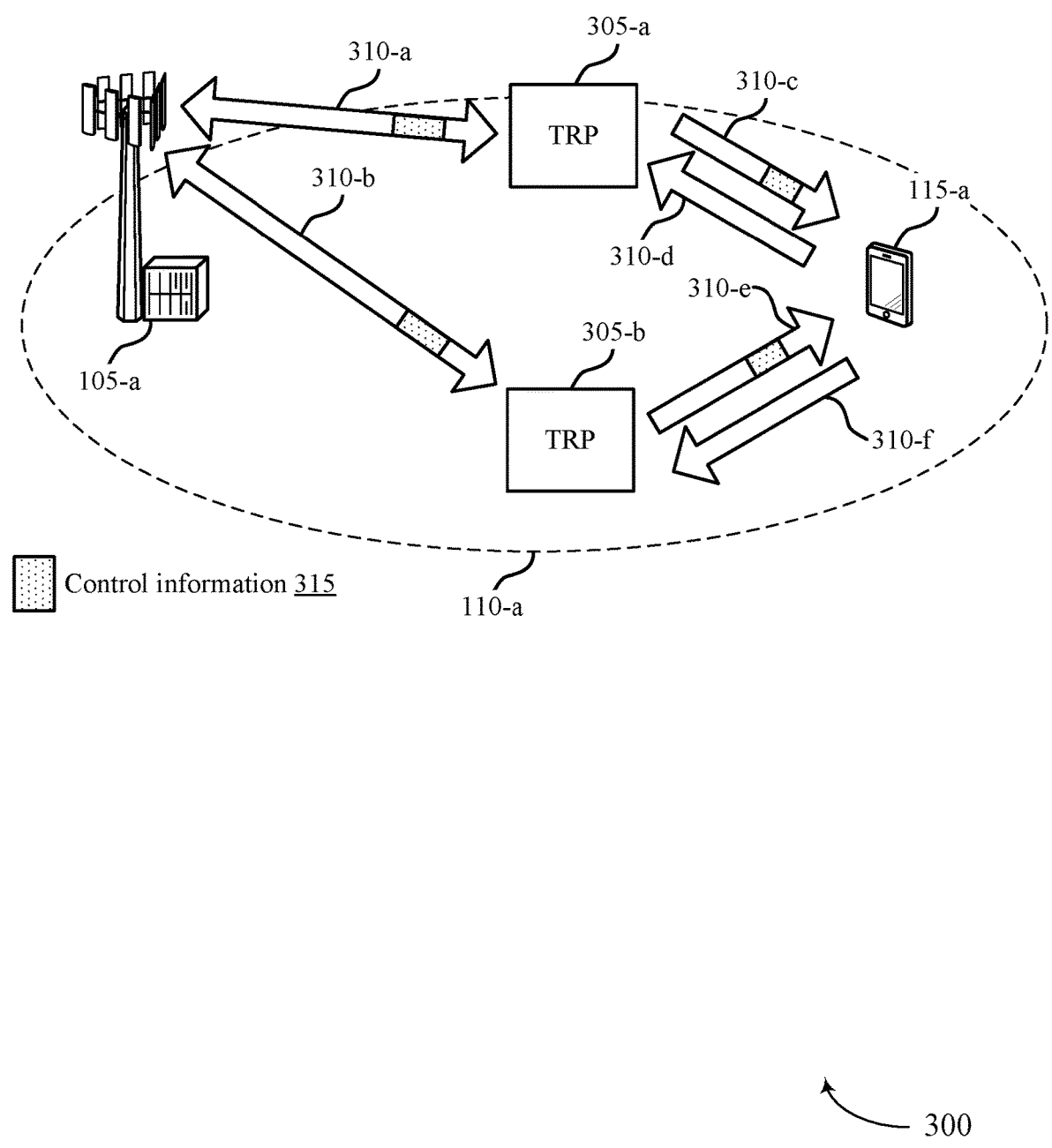
FIG. 3 illustrates an example of a wireless communications system that supports techniques for implementing full-duplex communications via mTRPs in accordance with one or more aspects of the present disclosure.

FIG. 3 illustrates an example of a wireless communications system 300 that supports techniques for implementing full-duplex communications via mTRPs in accordance with one or more aspects of the present disclosure. The wireless communications system 300 may include network entity 105-*a*, UE 115-*a*, and TRPs 305-*a* and 305-*b*, which may be examples of a network entity 105, UE 115, and TRPs as described with reference to FIG. 1. Network entity 105-*a* may serve a geographic coverage area 110-*a*. In some cases, wireless communications system 300 may represent a mTRP communications system in which UE 115-*a* may communicate with network entity 105-*a* via one or more TRPs such as TRP 305-*a* and 305-*b*. The devices may communicate via communication links 310 (e.g., communication links 310-*a*, 310-*b*, 310-*c*, 310-*d*, 310-*e*, 310-*f*), which may be wireless links, wirelined links, channels, or beams. Techniques may be implemented in wireless communications system 300 to support full duplex communications across the mTRPs.

In some wireless communications systems, such as wireless communications system 300, devices (e.g., network entities 105, UEs 115, network nodes, TRPs 305) may be capable of performing half-duplex operations, full-duplex operations, or both. In accordance with half-duplex operations, a device may transmit or receive during a time period, but not both. In accordance with full-duplex operations (e.g., in-band full duplex (IBFD), sub-band full duplex (SBFD), however, a device may transmit and receive simultaneously in the same, partial overlapping, or different frequency resources. In accordance with IBFD, a device may transmit and receive on the same time resources and at least partially overlapping frequency resources. In some cases, the frequency resources may be the same for the uplink and downlink communications (e.g., completely overlap). In some cases, the downlink frequency resources may be a subset of the uplink frequency resources, or vice versa. In accordance with SBFD (e.g., flexible duplex), a device may transmit and receive at the same time but on different frequency resources, such that the downlink frequency resources and the uplink frequency resources are separated. In some cases, the downlink frequency resources and the uplink frequency resources may be separated by a guard band.

In some implementations, a full-duplex network entity 105 may communicate with half-duplex devices, such as half-duplex UEs 115 (e.g., UEs 115 that are not capable of transmitting and receiving simultaneously). In some cases, such a scenario may be implemented in non-overlapping uplink and downlink subbands in accordance with SBFD. In some implementations, a full-duplex network entity 105 may communicate with full-duplex devices, such as full-duplex UEs 115, in partially or fully overlapping uplink and downlink frequency resources. In some implementations, a full-duplex network entity 105 may communicate with SBFD devices, such as SBFD UEs 115, in partially or fully overlapping uplink and downlink frequency resources.

In some cases, a device may be configured with resources in which the device may perform half-duplex operations, or full-duplex operations. For example, the device may receive a slot configuration indicating one or more slots that are allocated for uplink communication, one or more slots that are allocated for downlink configuration, one or more slots allocated for full-duplex (e.g., uplink and downlink communications), one or more slots that may be flexibly configured (e.g., flexible slots), or a combination thereof. In an example of a full-duplex slot, a slot may be indicated as a "D+U" slot. The full-duplex slot is a slot in which the frequency band is used for both uplink and downlink transmissions. The downlink and uplink transmissions may occur in overlapping bands (in-band full-duplex) or adjacent bands (sub-band full-duplex). In a given full-duplex symbol, a half-duplex UE 115 either transmits in the uplink band or receives in the downlink band. In a given full-duplex symbol, a full-duplex UE 115 may transmit in the uplink band and/or receive in the downlink band in the same slot. A full-duplex slot may include downlink only symbols, uplink only symbols, full-duplex symbols, or a combination thereof.

In some cases, a device that performs full-duplex communications may experience self-interference in which signals transmitted and received simultaneously at the device may cause interference with one other. In some cases, a UE 115, or some other device may communicate with TRPs 305 in a mTRP system, such that the UE 115 may communicate with a network entity via a first TRP 305-a, and a second TRP 305-b (or via any number of TRPs 305). Multi-TRP operation may be defined in a given geographic coverage area 110 (e.g., serving cell) from the perspective of a UE 115. It may be beneficial to implement mTRPs to support full duplex communications, such that a first TRP 305-a may transmit to and a second TRP 305-b may receive from the same or different UEs 115 or devices in overlapping resources. Accordingly, a network entity 105-a associated with the first and second TRPs 305 may perform full-duplex operations via the first and second TRPs 305 while mitigating self-interference at the network entity 105. For example, network entity 105-a may perform full-duplex communications with one or more devices, such as with one or more UEs 115, where performing in accordance with full-duplex operations may improve throughput of network entity 105-a. However, network entity 105-a may experience self-interference that may increase latency, or reduce reliability. Accordingly, to maintain the improved throughput, reduced latency, and improved reliability, network entity 105-a may implement the full-duplex operations via mTRPs, such as across TRPs 305-a and 305-b. For example, TRP 305-a may transmit to UE 115-a at the same time TRP 305-b is receiving from UE 115-a, or a different device, or vice versa. As such, network entity 105-a may still be operating in accordance with full-duplex operations, but the full-duplex operations are being carried out by TRPs 305 that are spaced apart, thereby mitigating self-interference at network entity 105-a, and TRPs 305-a and 305-b.

In some cases, mTRP operations may include multiple modes of operation: single DCI (s-DCI), and multi-DCI (m-DCI). With single-DCI based multi-TRP transmission, one DCI may be used to schedule a message (e.g., a PDSCH) transmitted from multiple TRPs. For example, TRP 305-a (or TRP 305-b) may transmit an s-DCI to UE 115-a, where the s-DCI schedules a message that both TRP 305-a and TRP 305-b will transmit to UE 115-a. Single-DCI operation may be applicable to ideal backhaul and may be implemented via different schemes (e.g., PDSCH schemes) for robustness, such as SDM, FDM, TDM. Single-DCI based schemes (e.g., SDM, FDM, TDM) may be focused on PDSCH reliability enhancements, such as reliable communications (e.g., spatial diversity) when the signal from one TRP 305 is blocked.

In multi-DCI cases, different physical downlink control channels (PDCCHs) can be independently transmitted from multiple TRPs to schedule the respective physical downlink shared channel (PDSCH) transmission. In accordance with m-DCI operation, a first DCI may be transmitted from TRP 305-a that schedules a first message (e.g., a first PDSCH) that is to be transmitted by TRP 305-a, and second DCI may be transmitted from TRP 305-b that schedules a second message (e.g., a second PDSCH) that is to be transmitted from TRP 305-b. At UE 115-a, UE 115-a may be configured to differentiate the two TRPs 305 based on a coreset index (e.g., a CORESETPoolIndex). Each CORESET (of max of 5 CORESETs) may be configured with a value of CORESETPoolIndex. The value of CORESETPoolIndex can be 0 or 1 which groups the CORESETs in to two groups. If a UE 115 is configured by a parameter (e.g., a higher layer parameter, such as PDCCH-Config) that includes two different values of CORESETPoolIndex in CORESETs for the active BWP of a serving cell, the UE 115 may determine that the UE 115 is configured with multi-DCI based mTRP. The CORESETPoolIndex of the CORESET in which a DCI is received may be used for different purposes such as HARQ-ACK codebook construction and transmission, PDSCH scrambling, and rate matching. Multi-DCI operation may be applicable to ideal or non-ideal backhaul and carrier aggregation framework may be leveraged to treat different TRPs 305 as different virtual component carriers from a UE capability perspective. Multi-DCI based mTRP operation may be motivated by non-ideal backhaul between TRPs 305 while specific features for ideal backhaul were also developed (e.g., joint versus separate HARQ-Ack for multi-DCI).

In some cases, full duplex operation across mTRP can be realized using half-duplex TRPs 305, where each TRP 305 may either operate in a transmitting or receiving mode at a time. In some cases, full duplex operation across mTRP can be realized using full-duplex (or mixed TRPs 305), where one or more TRP 305 may be capable of simultaneous transmission and reception. Techniques for implementing full duplex communications via mTRPs may be improved. For example, a UE may be configured with a per-cell TDD pattern that indicates half-duplex downlink and uplink slots, full-duplex slots, or both. Enabling full-duplex operations across mTRPs while a UE is configured with a per-cell TDD pattern may lead to inefficient operations as the UE may not be able to identify how a full-duplex slot is allocated to different TRPs involved in the FD operations.

To enable efficient FD operations across mTRPs, a UE 115 may be configured with a set of TDD patterns. The set of TDD patterns may include at least one TDD pattern specific to communications (e.g., a dedicated-TRP pattern, a TRP-specific TRP pattern) between the UE 115 and a first TRP 305 (e.g., TRP 305-a). Additionally, the set of TDD patterns may include a cell-common TDD pattern (e.g., a TDD pattern common to geographic coverage area 110-a, common to network entity 105-a, common to a set of TRPs), a TDD pattern specific to communications between the UE and a second TRP 305 (e.g., TRP 305-b), or both. For example, UE 115-a may receive control information 315 from network entity 105-a via TRP 305-a, TRP 305-b, or both indicative of one or more TDD patterns.

The UE 115 may then determine the TRP-specific TDD patterns for the first TRP 305 and the second TRP based on the set of TDD patterns. For example, the control information 315 may indicate a first TRP-specific TDD pattern for TRP 305-*a*, and a second TRP-specific TDD pattern for TRP 305-*b*. UE 115-*a* may determine the patterns from the indication in the control information 315. In another example, and as described in more detail with reference to FIG. 3, the control information 315 may indicate a first TRP-specific TDD pattern for TRP 305-*a* and a cell-common TDD pattern and UE 115-*a* may deduce a second TRP-specific TDD pattern for TRP 305-*b* based on the first pattern and the common pattern.

UE 115-*a* may communicate with TRPs 305-*a* and 305-*b* in accordance with the first and second TRP-specific patterns, respectively. For example, UE 115-*a* (e.g., a full-duplex UE 115) may transmit to TRP 305-*a* via communication link 310-*d* and receive from TRP 305-*b* via communication link 310-*e* in overlapping resources (e.g., at least overlapping time resources), or vice versa. Additionally, or alternately, the TRP-specific patterns may be used to support full duplex communications between network entity 105-*a* and multiple UEs 115, such as half duplex UEs, full-duplex UEs, or both via TRPs 305-*a* and 305-*b*.

In some aspects, and as described in more detail with reference to FIGS. 5A through 6, UE 115-*a* may also receive a frequency configuration associated with the mTRP communications. For example, UE 115-*a* may receive an indication of whether communications with two different TRPs 305 within a time resource (e.g., a slot, a symbol) will fully-overlap (e.g., in-band FD (IBFD)), partially overlap (e.g., partial IBFD), or not overlap in frequency (e.g., sub-band full-duplex) and in some cases, may indicate how the frequency resources are divided between the TRPs 305-*a*, and 305-*b*. In some cases, UE 115-*a* may be configured to perform the full duplex operation across mTRPs in accordance with scheduling received via a single DCI (e.g., control information 315 from one TRP 305) or via multiple DCIs (e.g., control information received from TRP 305-*a* and TRP 305-*b*). In some cases, and as described in more detail with reference to FIG. 3, UE 115-*a* may adjust transmission parameters corresponding to a particular TRP 305 in accordance with the TRP-specific TDD patterns.

Figure 4:
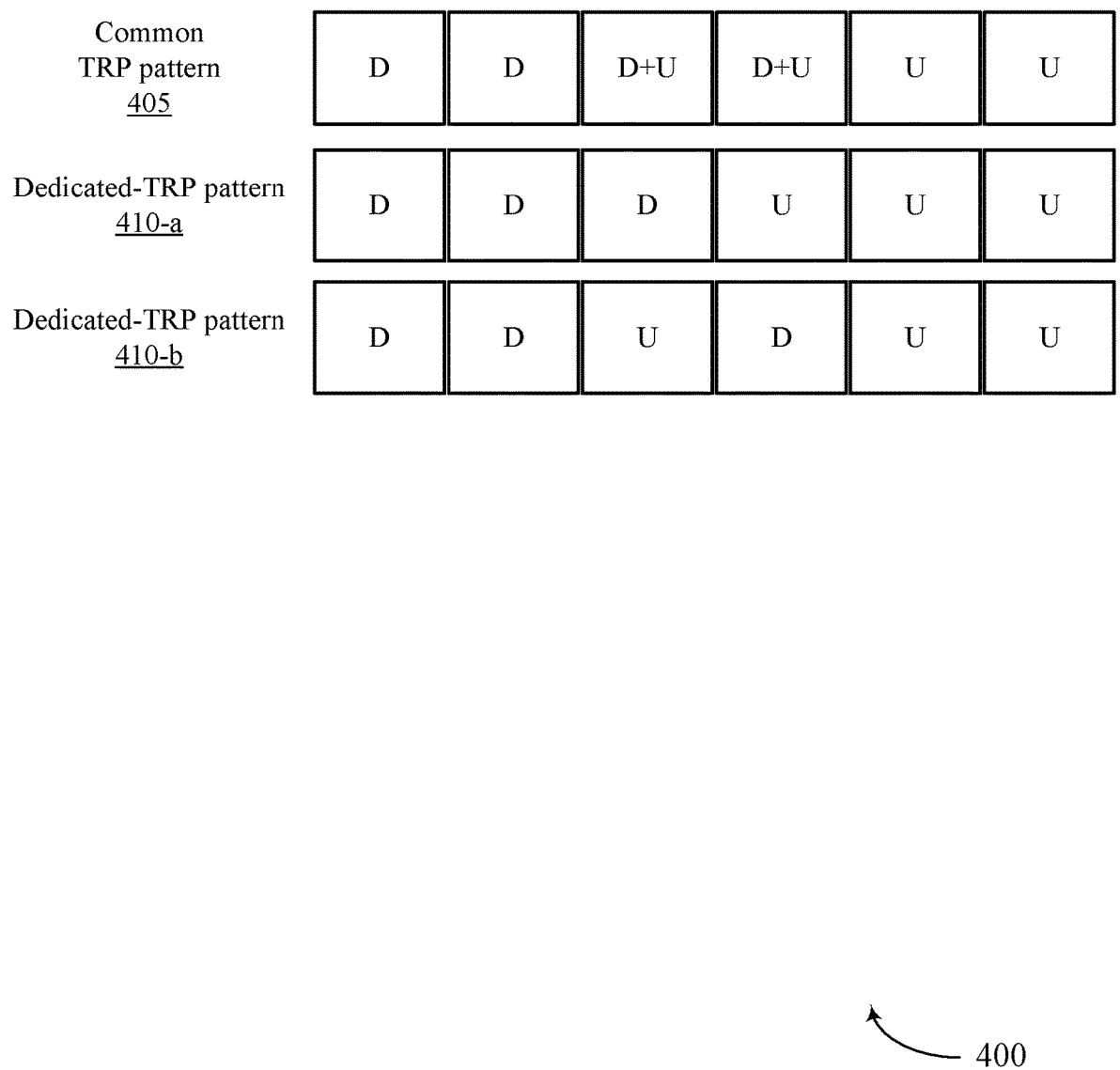
FIGS. 4 through 6 illustrate examples of communication configurations that support techniques for implementing full-duplex communications via mTRPs in accordance with one or more aspects of the present disclosure.

FIG. 4 illustrates an example of communication configurations 400 that support techniques for implementing full-duplex communications via mTRPs in accordance with one or more aspects of the present disclosure. The communication configurations 400 may include a common TRP pattern (e.g., a TDD pattern common to a geographic coverage area, common to a network entity, common to a set of TRPs), a dedicated-TRP pattern for a first TRP (e.g., TRP1), and a dedicated-TRP pattern for a second TRP (e.g., TRP2). The communication configurations 400 may be implemented by devices (e.g., network entity, a UEs, TRPs), which may be examples of a network entity 105, UE 115, and TRPs as described with reference to FIGS. 1 through 3. In some cases, communication configurations 400 may support a mTRP communications system in which a UE may communicate with network entity via one or more TRPs. Communication configurations 400 may support full duplex communications across the mTRPs.

As described with reference to FIG. 3, a UE may receive control information indicative of a list of one or more TRP-specific patterns (e.g., dedicated-TRP patterns, TDD-UL-DL-ConfigDedicated), a common TRP pattern (e.g., a common TDD pattern, TDD-UL-DL-ConfigurationCommon), or a combination thereof. Each TRP-specific pattern may correspond to one TRP of mTRPs. The duplex mode in a time resource (e.g., a slot) may be determined based on the list of TDD patterns. For example, if both TRPs are assigned downlink communications (or alternatively, an uplink slot) in the same slot, the slot is a half duplex slot. If however, one TRP is assigned downlink communication while the other TRP is assigned uplink communications, the slot is a full-duplex slot.

For example, a UE may receive control information (e.g., via one or more RRC messages, MAC-CE messages, DCI messages) indicating common TRP pattern 405 (e.g., common TDD pattern), dedicated-TRP pattern 410-*a* (e.g., a TRP-specific TDD pattern for a first mTRP), and dedicated-TRP pattern 410-*b* (e.g., a TRP-specific TDD pattern for a second mTRP). Alternatively, the UE may receive control information indicating common TRP pattern 405, and dedicated-TRP pattern 410-*a*. The UE may then determine dedicated-TRP pattern 410-*b* based on common TRP pattern 405, and dedicated-TRP pattern 410-*a*. For example, the UE may determine that the third time resource (e.g., the third slot) is a full-duplex slot (e.g., depicted as D+U) and may determine that the dedicated-TRP pattern 410-*a* is allocated downlink communications in the third time resource. Therefore, the UE may determine that dedicated-TRP pattern 410-*b* is allocated uplink communications in the third time resources. In some cases, the UE may be preconfigured with a set of TDD patterns, such one or more common TRP patterns 405, one or more dedicated-TRP patterns 410, or a combination thereof. In such cases, the control information may identify one or more patterns from the set of preconfigured patterns for particular mTRP communications (e.g., via identifiers associated with each preconfigured pattern, via a look up table).

In some cases, such as for full-duplex operations across mTRP using single-DCI, in half-duplex slots, mTRP operations may be transparent (e.g., known) to the UE. In full-duplex slots, where one TRP slot type is downlink and the other is uplink, the UE may identify which TRP is operating in accordance with a receiving mode and which TRP is operating in accordance with a transmitting mode based on TDD patterns 405, 410-*a*, and 410-*b*. For example, in the third time resource, the UE may identify that a first TRP is operating in a transmitting mode (e.g., to support the downlink communications), and a second TRP is operating in a receiving mode (e.g., to support the uplink communications). In some cases, the UE may link communication parameters to the dedicated-TRP patterns, where the communications parameters may be specific to communications with the TRP associated with the dedicated-TRP pattern. For example, the UE may link TCI states to the dedicated-TRP patterns, such as a first TCI state associated with a first TRP to dedicated-TRP pattern 410-*a* and a second TCI state associated with a second TRP to dedicated-TRP pattern 410-*b*.

In some cases, some fields implemented for PUSCH and/or PUCCH repetitions may be used for uplink transmissions (without repetitions). For example, a repetition index may be used to identify beam and power control parameters for each repetition. Similarly, a UE may identify TRP-specific beam parameters, power control parameters, and timing advances, based on TRP-specific TDD patterns. That is, there may be an association between uplink transmission parameters and TRPs based on corresponding TRP-specific TDD patterns. For example, the UE may use the dedicated-TRP patterns to determine how to communicate with each TRP such that the UE may switch to uplink transmission parameters associated with the second TRP in the third slot based on the second TRP being allocated uplink communications in the third slot of dedicated-TRP pattern 410-*b*. Similarly, the UE may switch to uplink transmission parameters associated with the first TRP in the fourth slot based on the first TRP being allocated uplink communications in the fourth slot of dedicated-TRP pattern 410-*a*.

In some cases, such as for full-duplex operations across mTRP using single-DCI, slot counting for scheduling (e.g., such as available slot counting or slot counting for and K0, K1, and K2) may be based on a common TRP pattern 405 (e.g., similar to full duplex operations with a sTRP). However, a mismatch may arise between a dedicated-TRP pattern 410 and uplink scheduling, such as due to a repetition pattern for the UE being determined based on the common TRP pattern 405. For example, the UE may configured to perform PUSCH repetitions with four repetitions in accordance with cyclic mapping based on the common TRP pattern 405. The cyclic mapping may follow a 2121 pattern, where 1 may refer to a first TRP, and 2 may refer to a second TRP. The UE may be configured to start the repetitions in the third slot, where the UE is configured to transmit a PUSCH repetition to the second TRP in the third slot, transmit a PUSCH repetition to the first TRP in the fourth slot, transmit a PUSCH repetition to the second TRP in the fifth slot, and transmit a PUSCH repetition to the first TRP in the sixth slot. Such a cyclic 2121 mapping may align with dedicated-TRP patterns 410-*a* and 410-*b*. However, instead the UE may be configured to perform PUSCH repetitions with four repetitions in accordance with sequential mapping based on the common TRP pattern 405. For example, the cyclic mapping may follow a 2211 pattern, where 1 may refer to a first TRP, and 2 may refer to a second TRP. The UE may be configured to start the repetitions in the third slot, where the UE is configured to transmit a PUSCH repetition to the second TRP in the third slot, transmit a PUSCH repetition to the second TRP in the fourth slot, transmit a PUSCH repetition to the first TRP in the fifth slot, and transmit a PUSCH repetition to the first TRP in the sixth slot. Such a sequential mapping may result in a conflict in the fourth slot as the UE is configured to transmit to the second TRP in a slot configured for downlink communications by dedicated TDD pattern 410-*b*, even though the repetition pattern was determined based on the common TRP pattern 405.

To mitigate such mismatches, the mismatch may be avoided by action by the scheduling network entity, action by the UE, or both. In some cases, a UE may not be expected to be scheduled with a PUSCH repetition sequence conflicting with TRP-specific TDD patterns, and/or any scheduled messages that conflict with TRP-specific TDD patterns. In such cases, the network entity may ensure that repetition patterns, scheduled messages, or both align with dedicated-TRP patterns 410. In some cases, if a scheduled message and/or repetition sequence (e.g., PUSCH repetition sequence) mismatches with a dedicated-TRP pattern 410, the TRP-TDD pattern may take precedence and the UE may be configured to drop the conflicting message. In some cases, if a scheduled message and/or repetition sequence (e.g., PUSCH repetition sequence) mismatches with a dedicated-TRP pattern 410, the UE may ignore the dedicated-TRP pattern and transmit the message regardless of the mismatch. Such mismatch mitigation techniques may be implemented to mitigate mismatches in scheduled messages (e.g., uplink messages, downlink messages) other than repetitions, and to mitigate mismatches in scheduled repetitions.

In a multi-DCI framework, a UE may differentiate between mTRPs based on an index indicative of a TRP (e.g., a CORESETPoolIndex). In some cases, such as for full-duplex operations across mTRPs with multi-DCIs, a UE may be configured with a method for associating dedicated-TRP patterns and TRP indices (e.g., CORESETPoolIndices). In some cases, slot counting for scheduling such as available slot counting and slot counting for K0, K1 and K2 may be based on a common-TDD pattern 405. If a scheduling conflict arises between a scheduled transmission (e.g., uplink or downlink) and a dedicated-TRP pattern, similarly to the sDCI scenario, the TRP-TDD pattern may take precedence and the UE may be configured to drop or ignore the scheduled transmission. In some cases, if a scheduled transmission mismatches with a dedicated-TRP pattern 410, the UE may ignore the dedicated-TRP pattern and transmit or receive the scheduled transmission. In some cases, slot counting for scheduling such as available slot counting and slot counting for K0, K1 and K2 may be based on a dedicated-TRP pattern 410. Available slot counting based on a dedicated-TRP pattern 410 may be different from counting based on a common TRP pattern 405 and may mitigate mismatches.

Figure 5A:
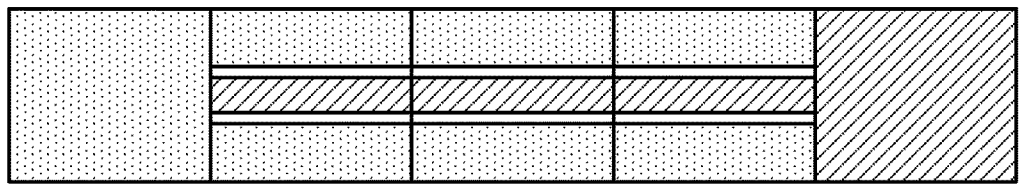
Figure 5A:
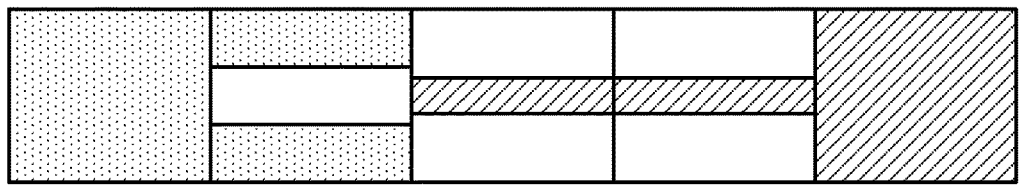
Figure 5A:
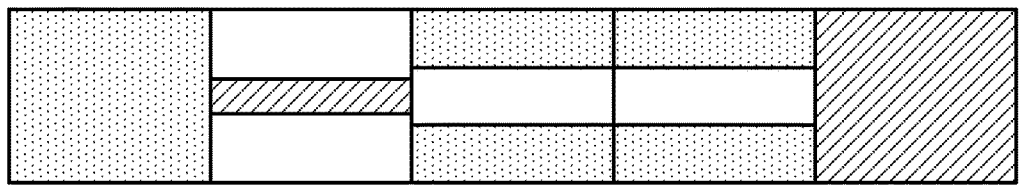
Figure 5B:
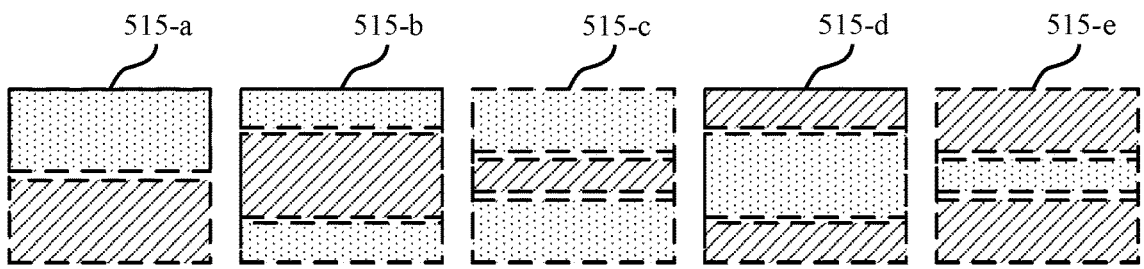

FIGS. 5A and 5B illustrate examples of communication configurations 500 and 501 that support techniques for implementing full-duplex communications via mTRPs in accordance with one or more aspects of the present disclosure. The communication configurations 500 and 501 may depict frequency configurations for mTRP communications. The communication configurations 500 and 501 may be implemented by devices (e.g., network entity, UEs, TRPs), which may be examples of a network entity 105, UE 115, and TRPs as described with reference to FIGS. 1 through 4 and may be implemented in combination with common and dedicated TRP patterns as described with reference to FIG. 4 (e.g., common and dedicated TDD patterns). In some cases, communication configurations 500 and 501 may support a mTRP communications system in which a UE may communicate with network entity via one or more TRPs. Communication configurations 500 and 501 may support full duplex communications across the mTRPs.

In some aspects, uplink and downlink communications implemented across mTRPs in a time resource (e.g., a slot) may fully-overlap in frequency resources (e.g., in-band FD (IBFD)), partially overlap in frequency resources (e.g., partial IBFD), or may not overlap in frequency resources (e.g., sub-band full-duplex). For example, FIGS. 5A and 5B may depict a scenario in which uplink and downlink resources do not overlap in accordance with an SBFD scheme. For example, the slots may be configured at SBFD slots and the component carrier bandwidth within the SBFD slots may be divided into non-overlapping uplink and downlink subbands. In some cases, the non-overlapping uplink and downlink subbands may be separated by guard bands. In some cases, a UE may benefit from identifying frequency configurations of a half-duplex slot, full-duplex slot, or both. For example, it may be beneficial for a UE to identify the locations of such SBFD slots and the frequency resources of both the uplink and downlink subbands in the SBFD slots.

To indicate to the UE the configuration of uplink and downlink resources in a full-duplex slot, a half-duplex slot, or both the network entity may transmit (e.g., directly, or via one or more TRPs) a message to the UE indicating whether a time resource is configured for half duplex communications. In some cases, the message may indicate whether a time resource is configured for full-duplex operations in which the uplink and downlink resources share the same frequency resources, such that the uplink and downlink resources completely overlap in time and frequency. Such a full duplex configuration may have the same frequency resources as a half duplex configuration (e.g., no frequency split). In some cases, the message may indicate whether a time resource is configured in accordance with an SBFD scheme. In some cases, the message may indicate whether a time resource is configured with partial frequency overlapping in accordance with an IBFD scheme.

In some aspects, the UE may be configured with a mapping, where each frequency allocation type (e.g., half-duplex, fully-overlap, partial overlap) may be associated with an index. Then, the UE may receive an indication of the index for a time resource and identify which frequency allocation type corresponds to that time resource. For example, a half duplex slot or full duplex slot with same frequency resources as a half duplex slot (e.g., fully overlapping frequency resources) may be associated with a 0, and an SBFD slot or IBFD with partial frequency overlapping may be associated with a 1. Accordingly, the UE may receive a 0 or 1 for one or more time resources, such as for each time resource. In some cases, the UE may receive a TDD-UL-DL-subband-pattern (e.g., a slot or symbol level bitmap with periodicity) indicative of the frequency configurations for a time resource. In some aspects, the UE may be preconfigured with the association between frequency configurations and indices, or the UE may receive a control message, such as an RRC message, MAC-CE message, and/or DCI message indicative of the association. In the same or in a different control message, the UE may receive an index for each time resource.

For example, with reference to FIG. 5A, the UE may receive one or more messages indicating a 01110 frequency configuration pattern (e.g., TDD-UL-DL-subband-pattern) for five slots. Accordingly, the UE may determine that there is no frequency split in the first and last slots, but determine that there is a frequency split between uplink and downlink communications in the second through fourth slots depicted in FIG. 5A.

Additionally or alternatively to receiving an indication (e.g., UL-DL-subband-frequency-resources) of whether frequency resources are split in a time resource, the UE may receive an indication (e.g., via RRC, MAC-CE, DCI) of how uplink and downlink resources are split in a time resource (e.g., an exact split between uplink and downlink resources). In some cases, the indication may directly include the frequency split of a time resource. For example, the UE may receive a message including frequency split 515-*a* for a time resource. In some cases, the indication may include an index associated with a preconfigured frequency split. For example, with reference to FIG. 5B, the UE may be preconfigured with frequency splits 515-*a* through 515-*e* (e.g., frequency splits 515-*a*, 515-*b*, 515-*c*, 515-*d*, 515-*e*), where each frequency split may be associated with an index. Then, the UE may receive a message including an index for a time resource that the UE may use to identify how uplink and downlink resources are split for the time resource. For example, additionally or alternatively to receiving the TDD-UL-DL-subband-pattern, the UE may receive an indication that the second through fourth slots depicted in FIG. 5A are configured in accordance with frequency split 515-*c*.

In some cases, the UE may use the frequency configuration pattern in combination with one or more TDD patterns (e.g., a common TRP pattern, one or more dedicated-TRP patterns) to determine time and frequency configurations of a time resource. The UE may use the one or more TRP patterns to split a common TRP pattern 505 (e.g., common TDD pattern) into dedicated TRP pattern 510-*a* associated with a first TRP and dedicated TRP pattern 510-*b* associated with a second TRP. For example, a UE may identify a duplexing mode of a slot from dedicated-TRP patterns but may identify a frequency split of a slot based on a TDD-UL-DL-subband-pattern, a UL-DL-subband-frequency-resources message, or both. Therefore, based on the dedicated-TDD patterns, the UE may determine that a first TRP (e.g., represented by dedicated TRP pattern 510-*b*) is configured with downlink resources in the second slot, and uplink resources in the third and fourth slots. Similarly, the UE may determine that a second TRP (e.g., represented by dedicated TRP pattern 510-*b*) is configured with uplink resources in the second slot, and downlink resources in the third and fourth slots. Then, based on a TDD-UL-DL-subband-pattern, a UL-DL-subband-frequency-resources message, or both, the UE may determine which resources are actually allocated for uplink and downlink communications in the second through fourth slots.

Figure 6:
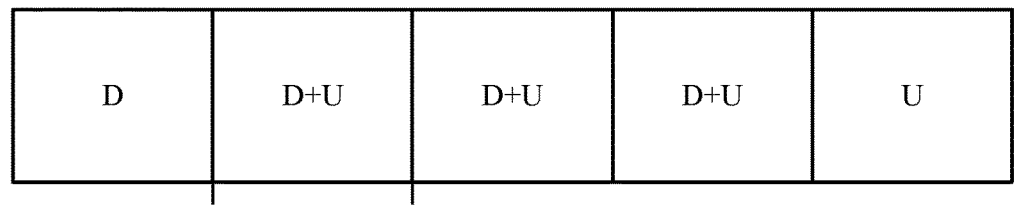
Figure 6:
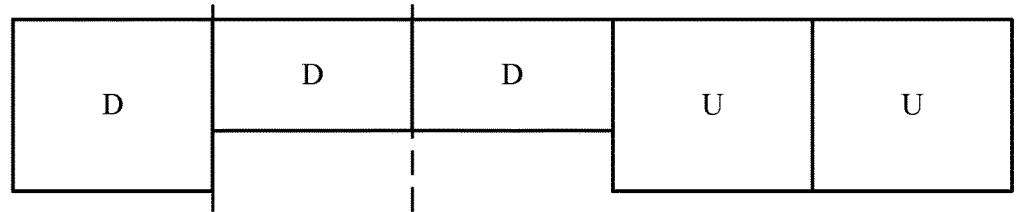
Figure 6:
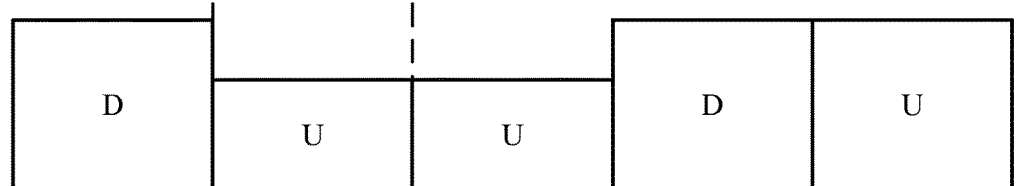
Figure 6:
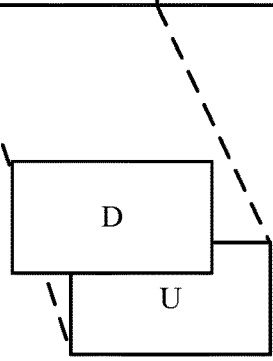

FIG. 6 illustrates an example of communication configurations 600 that support techniques for implementing full-duplex communications via mTRPs in accordance with one or more aspects of the present disclosure. The communication configuration 600 may depict frequency configurations for mTRP communications. The communication configuration 600 may be implemented by devices (e.g., network entity, UEs, TRPs), which may be examples of a network entity 105, UE 115, and TRPs as described with reference to FIGS. 1 through 5B and may be implemented in combination with common and dedicated TRP patterns as described with reference to FIG. 4. In some cases, communication configuration 600 may support a mTRP communications system in which a UE may communicate with network entity via one or more TRPs. Communication configurations 600 may support full duplex communications across the mTRPs.

In some aspects, uplink and downlink communications implemented across mTRPs in a time resource (e.g., a slot) may fully-overlap in frequency resources (e.g., in-band FD (IBFD)), partially overlap in frequency resources (e.g., partial IBFD), or may not overlap in frequency resources (e.g., sub-band full-duplex). For example, FIG. 6 may depict a scenario in which uplink and downlink resources partially overlap in accordance with an IBFD scheme. For example, the slots may be configured as IBFD slots and the component carrier bandwidth within the IBFD slots may support partially overlapping uplink and downlink subbands. In some cases, a UE may benefit from identifying frequency configurations of a half-duplex slot, full-duplex slot, or both. For example, it may be beneficial for a UE to identify the locations of such IBFD slots and the frequency resources of both the uplink and downlink subbands within the IBFD slots.

As described with reference to FIGS. 5A and 5B, the UE may receive one or more messages indicative of the frequency configurations for time resources (e.g., TDD-UL-DL-subband-pattern, a UL-DL-subband-frequency-resources message, or both). For example, the UE may receive an indication that the first slot, fourth slot, and fifth slot, as depicted in FIG. 6, do not have a frequency splits, and/or receive an indication that the second and third slots do have an uplink and downlink frequency split. Additionally, or alternatively, the UE may receive an indication that the second and third slot partially overlap. Additionally, or alternatively, the UE may receive an indication of the subband occupied by the uplink resources in the second and third slots, the subband occupied by the downlink resources in the second and third slots, the subband in which the uplink and downlink resources overlap in the second and third slots, or a combination thereof.

In some aspects, the UE may only receive an indication that a time resource does have an uplink and downlink frequency split. Accordingly, if the UE does not receive such an indication for a time resource, the UE may determine that there is not a frequency split for that time resources based on the absence of an indication.

In some cases, and as described in more detail with reference to FIGS. 5A and 5B, the UE may use the frequency configuration pattern in combination with one or more TDD patterns (e.g., a common TRP pattern, one or more dedicated-TRP patterns) to determine time and frequency configurations of a time resource. The UE may use the one or more TRP patterns to split a common TRP pattern 605 into dedicated TRP pattern 610-a associated with a first TRP and dedicated TRP pattern 610-b associated with a second TRP.

Figure 7:
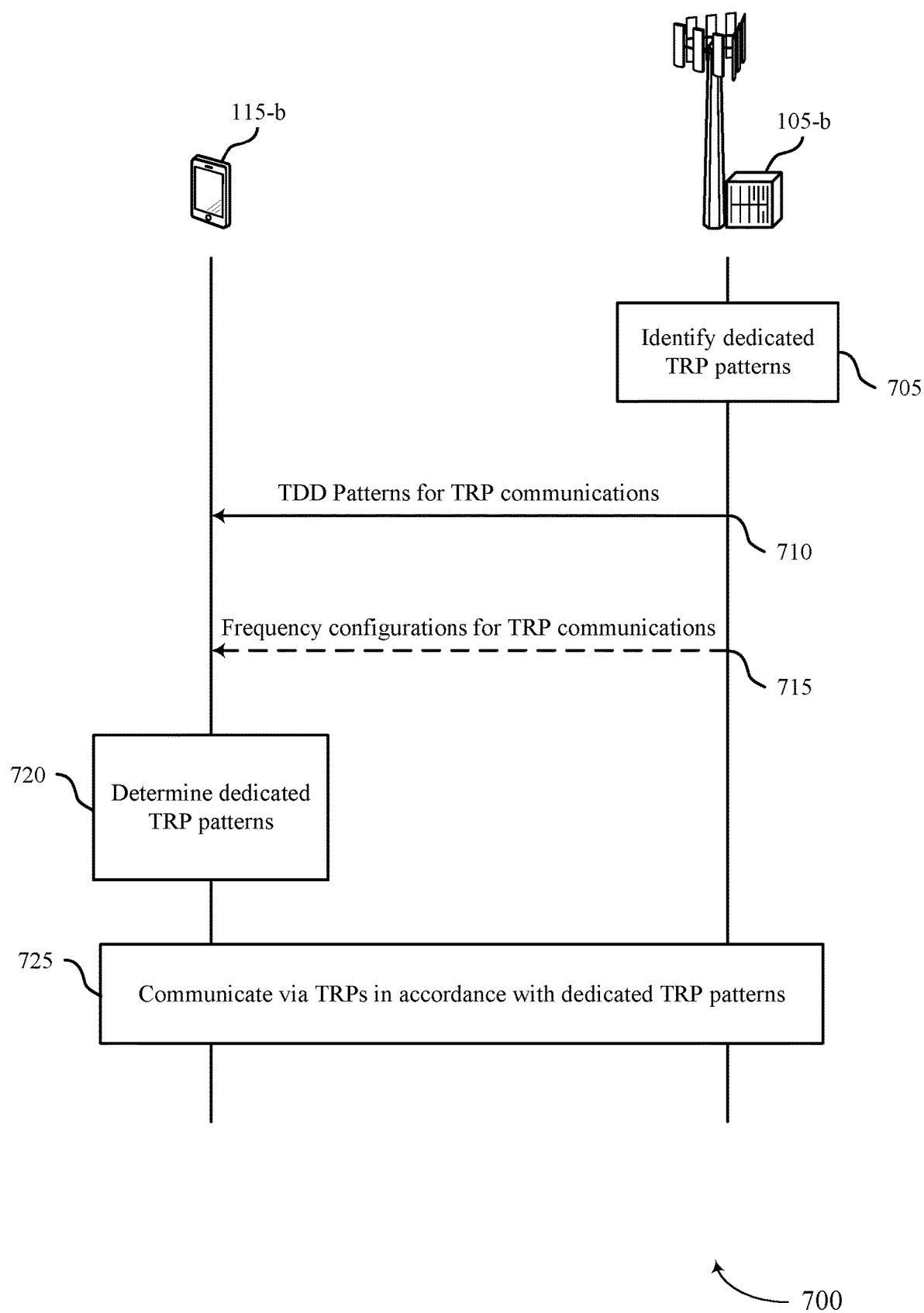
FIG. 7 illustrates an example of a process flow that supports techniques for implementing full-duplex communications via mTRPs in accordance with one or more aspects of the present disclosure.

FIG. 7 illustrates an example of a process flow 700 that supports techniques for implementing full-duplex communications via mTRPs in accordance with one or more aspects of the present disclosure. The process flow 700 may illustrate an example of communications in an mTRP system. For example, network entity 105-b may communicate with one or more UEs 115 via multiple TRPs. Network entity 105-b and UE 115-b (e.g., a half-duplex UE 115, a full-duplex UE 115) may be examples of the corresponding wireless devices described with reference to FIGS. 1 through 6. Network entity 105-b may configure communication configurations to support full-duplex operations across mTRPs. In some cases, instead of network entity 105-b configuring the communication configurations, a different type of wireless device (e.g., a UE 115, a TRP, a network node) may determine the communication configurations. Alternative examples of the following may be implemented, where some steps are performed in a different order than described or are not performed at all. In some cases, steps may include additional features not mentioned below, or further steps may be added.

At 705, network entity 105-b may identify at least a first dedicated TDD pattern for TDD communications between UE 115-b and a first TRP from a set of multiple TRPs associated with the network entity 105-b and a second dedicated TDD pattern for TDD communications between the UE 115-b and a second TRP from the set of multiple TRPs associated with the network entity 105-b.

At 710, UE 115-b may receive control information indicative of a set of TDD patterns. A first dedicated TDD pattern of the set of TDD patterns may be dedicated for TDD communications between the UE 115-b and a first TRP from a set of multiple TRPs associated with a network entity.

In some cases, at 715 and as described in more detail with reference to FIGS. 5A through 5, UE 115-b may receive additional control information indicative of an allocation of frequency resources for one or more slots. The additional control information may be indicative of whether a slot is configured for half-duplex communications, full duplex communications in which multiple TRPs are allocated a same set of frequency resources, sub-band full duplex communications, or whether there is partial overlap of uplink resources and downlink resources in an in-band full-duplex slot. The additional control information may indicate a first allocation of frequency resources from a set of allocations of frequency resources (e.g., preconfigured allocations).

In some implementations, receiving the control information may include receiving a first downlink control information message indicative of scheduling information for the first TRP, and receiving a second downlink control information message indicative of scheduling information for the second TRP (e.g., multi-DCI). Communicating with the network entity 105-b may be based at least in part on receiving the first downlink control information message and the second downlink control information message. In some implementations, receiving the control information may include receiving a single downlink control information message indicative of scheduling information for the first TRP and the second TRP. Communicating with the network entity 105-b may be based at least in part on receiving the single downlink control information message.

At 720, UE 115-b may determine at least a second dedicated TDD pattern for TDD communications between the UE 115-b and at least a second TRP from the set of multiple TRPs based at least in part on the set of TDD patterns. In some cases, UE 115-b may determine one or more frequency-specific TDD patterns for the communicating with the network entity 105-b. The one or more frequency-specific TDD patterns may be based on the additional control information and at least one of the first dedicated TDD pattern or the second dedicated TDD pattern.

The set of TDD patterns may include the second dedicated TDD pattern for communications between the UE 115-b and at least the second TRP, where determining at least the second dedicated TDD pattern may be based at least in part on receiving the control information indicative of the second dedicated TDD pattern. The set of TDD patterns may include a common TDD pattern for TDD communications associated with the network entity 105-b. In some cases, determining the second dedicated TDD pattern may include determining the second dedicated TDD pattern based at least in part on the first dedicated TDD pattern and the common TDD pattern. Each TDD pattern of the set of TDD patterns may include one or more full-duplexing slots, one or more half-duplexing slots, or a both.

At 725, UE 115-b may communicate with the network entity via at least one of the first TRP or the second TRP in accordance with the first dedicated TDD pattern, the second dedicated TDD pattern, or both. Communicating with the network entity 105-b may include receiving one or more first messages from the first TRP in a full-duplex slot in accordance with the first dedicated TDD pattern, and transmitting, simultaneously with receiving the one or more first messages, one or more second messages to the second TRP in the full-duplex slot in accordance with the second dedicated TDD pattern.

In some cases, and as described in more detail with reference to FIG. 2, UE 115-b may identify a first set of communication parameters associated with the first dedicated TDD pattern and a second set of communication parameters associated with the second dedicated TDD pattern. UE 115-b may communicate via the first TRP and the second TRP by switching between the first set of communication parameters and the second set of communication parameters in accordance with the respective first dedicated TDD pattern and the second dedicated TDD pattern. The first set of communication parameters and the second set of communication parameters may each include a transmission configuration indicator state, a control resource set pool index, one or more beam control parameters, one or more power control parameters, one or more timing advance parameters, or a combination thereof. In some implementations, communicating with the network entity 105-b may include receiving one or more messages from the first TRP, the second TRP, or both in a half-duplex, downlink slot, or a full-duplex slot in accordance with the set of TDD patterns.

In some impetrations, communicating with the network entity 105-b may include transmitting one or more messages to the first TRP, the second TRP, or both in a half-duplex, uplink slot or a full-duplex slot in accordance with the set of TDD patterns.

In some cases, and as described in more detail with reference to FIG. 2, UE 115-b may receive an indication of an uplink repetition sequence associated with the first TRP and the second TRP. Communicating with the network entity 105-b may be based at least in part on the uplink repetition sequence. UE 115-b may identify that the uplink repetition sequence aligns with the first dedicated TDD pattern and the second dedicated TDD pattern, where the UE 115-b may communicate with the network entity 105-b in accordance with the uplink repetition sequence, the first dedicated TDD pattern, and the second dedicated TDD pattern. In some cases, UE 115-b may identify that one or more repetitions of the uplink repetition sequence fail to align with the first dedicated TDD pattern, the second dedicated TDD pattern, or both. In such cases, UE 115-b may refrain to transmit the one or more repetitions of the uplink repetition sequence based on the one or more repetitions failing to align with the first dedicated TDD pattern, the second dedicated TDD pattern, or both. Alternatively, UE 115-b may transmit the one or more repetitions of the uplink repetition sequence irrespective of the one or more repetitions failing to align with the first dedicated TDD pattern, the second dedicated TDD pattern, or both. The uplink repetition sequence may indicate a number of repetitions of an uplink message in accordance with a cyclic mapping, or a sequential mapping. Repetitions of the uplink repetition sequence may alternate between the first TRP and the second TRP.

In some aspects, UE 115-b may perform slot counting for the first TRP, the second TRP, or both based at least in part on a common TDD pattern of the set of TDD patterns for TDD communications associated with the network entity 105-b. In some cases, UE 115-b may identify a scheduling conflict between one or more scheduled messages and the first dedicated TDD pattern based at least in part on the slot counting. In such cases, UE 115-b may refrain to transmit the one or more scheduled messages based at least in part on the scheduling conflict. Alternatively, UE 115-b may transmit the one or more scheduled messages irrespective of the scheduling conflict. In some cases, network entity 105-a may configure one or more scheduled messages, the uplink repetition sequence, or both such that the scheduled messages, the uplink repetition sequence, or both aligns with the first dedicated TDD pattern and the second dedicated TDD pattern (e.g., such that no conflict occurs).

In some aspects, UE 115-b may perform slot counting for the first TRP, the second TRP, or both based at least in part on a respective dedicated TDD patterns associated with each of the first and second TRPs.

Figure 8:
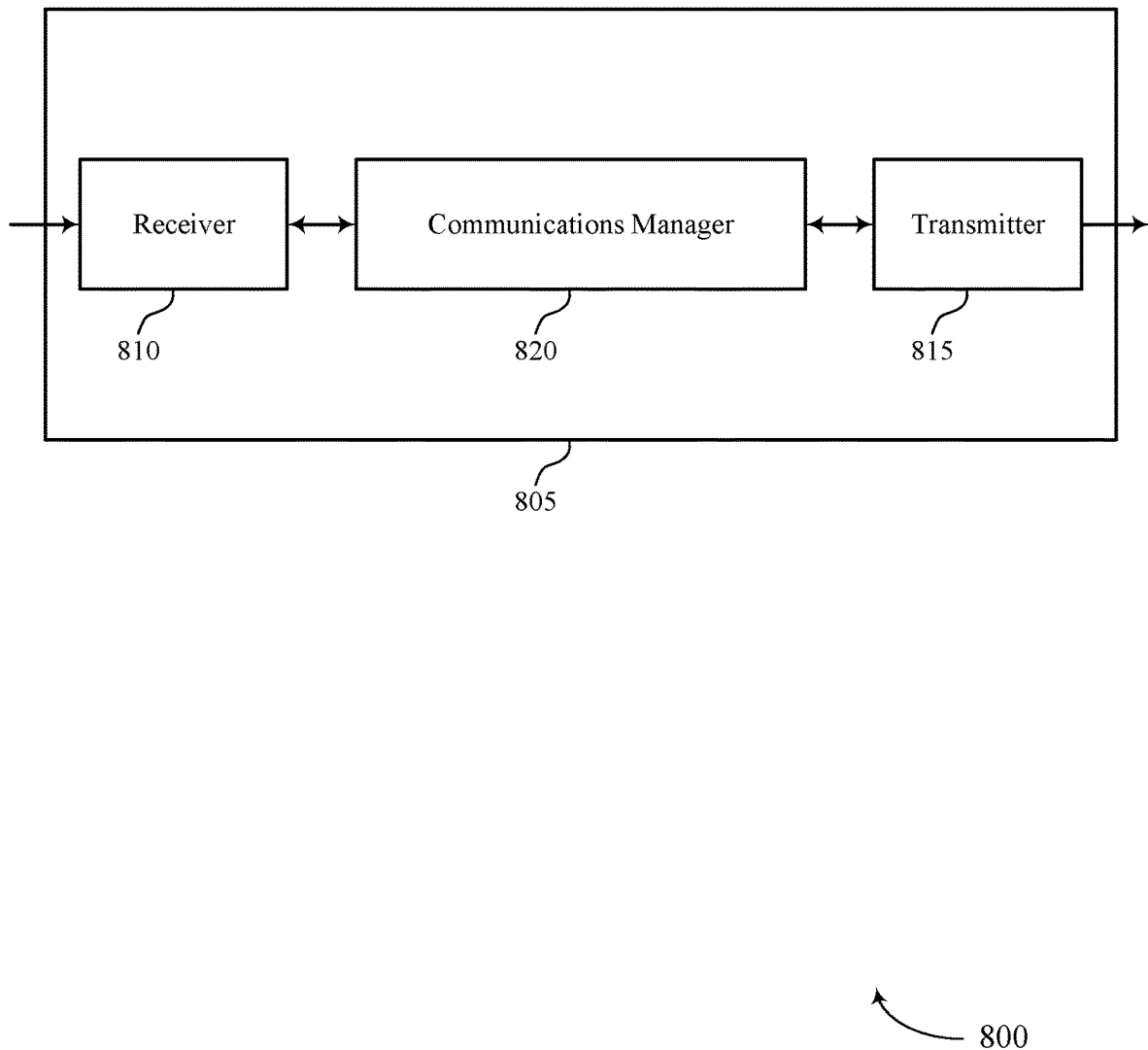
FIGS. 8 and 9 show block diagrams of devices that support techniques for implementing full-duplex communications via mTRPs in accordance with one or more aspects of the present disclosure.

FIG. 8 shows a block diagram 800 of a device 805 that supports techniques for implementing full-duplex communications via mTRPs in accordance with one or more aspects of the present disclosure. The device 805 may be an example of aspects of a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to techniques for implementing full-duplex communications via mTRPs). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to techniques for implementing full-duplex communications via mTRPs). In some examples, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be examples of means for performing various aspects of techniques for implementing full-duplex communications via mTRPs as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a digital signal processor (DSP), a central processing unit (CPU), a graphics processing unit (GPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. Software shall be construed broadly to mean instructions, instruction sets, code, code segments, program code, programs, subprograms, software modules, applications, software applications, software packages, routines, subroutines, objects, executables, threads of execution, procedures, or functions, etc., whether referred to as software, firmware, middleware, microcode, hardware description language, or otherwise. In some examples, a processor and memory coupled with the processor may be configured to perform one or more of the functions described herein (e.g., by executing, by the processor, instructions stored in the memory).

Additionally, or alternatively, in some examples, the communications manager 820, the receiver 810, the transmitter 815, or various combinations or components thereof may be implemented in code (e.g., as communications management software) executed by a processor. If implemented in code executed by a processor, the functions of the communications manager 820, the receiver 810, the transmitter 815, or various combinations or components thereof may be performed by a general-purpose processor, a DSP, a CPU, a GPU, an ASIC, an FPGA, a microcontroller, or any combination of these or other programmable logic devices (e.g., configured as or otherwise supporting a means for performing the functions described in the present disclosure).

In some examples, the communications manager 820 may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communications at a UE in accordance with examples as disclosed herein. For example, the communications manager 820 may be configured as or otherwise support a means for receiving control information indicative of a set of multiple TDD patterns, where a first dedicated TDD pattern of the set of multiple TDD patterns is for TDD communications between the UE and a first TRP from a set of mTRPs associated with a network entity. The communications manager 820 may be configured as or otherwise support a means for determining at least a second dedicated TDD pattern for TDD communications between the UE and at least a second TRP from the set of mTRPs based on the set of multiple TDD patterns. The communications manager 820 may be configured as or otherwise support a means for communicating with the network entity via at least one of the first TRP or the second TRP in accordance with the first dedicated TDD pattern, the second dedicated TDD pattern, or both.

By including or configuring the communications manager 820 in accordance with examples as described herein, the device 805 (e.g., a processor controlling or otherwise coupled with the receiver 810, the transmitter 815, the communications manager 820, or a combination thereof) may support techniques for more efficient utilization of communication resources.

Figure 9:
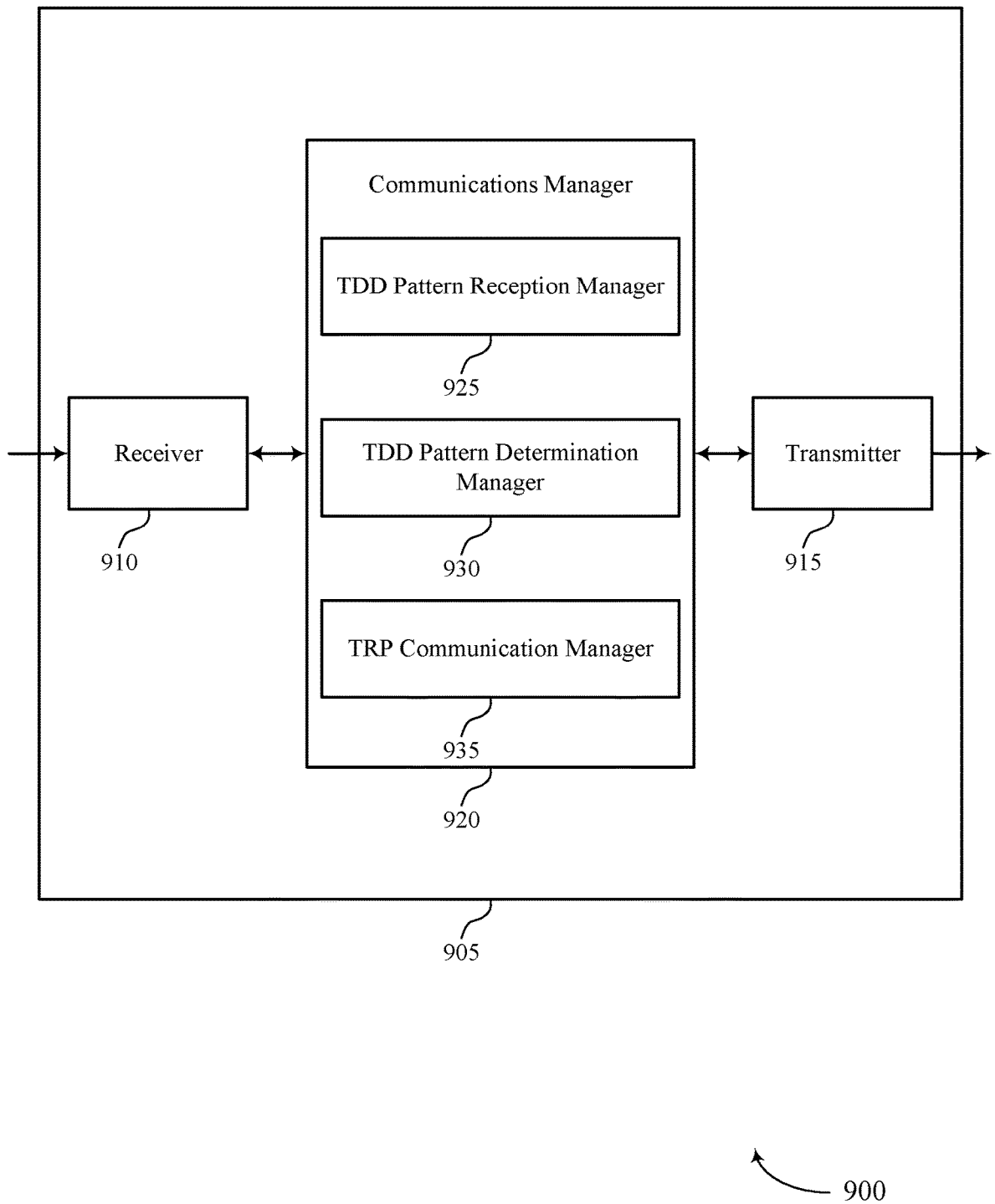

FIG. 9 shows a block diagram 900 of a device 905 that supports techniques for implementing full-duplex communications via mTRPs in accordance with one or more aspects of the present disclosure. The device 905 may be an example of aspects of a device 805 or a UE 115 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to techniques for implementing full-duplex communications via mTRPs). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to techniques for implementing full-duplex communications via mTRPs). In some examples, the transmitter 915 may be co-located with a receiver 910 in a transceiver module. The transmitter 915 may utilize a single antenna or a set of multiple antennas.

The device 905, or various components thereof, may be an example of means for performing various aspects of techniques for implementing full-duplex communications via mTRPs as described herein. For example, the communications manager 920 may include a TDD pattern reception manager 925, a TDD pattern determination manager 930, an TRP communication manager 935, or any combination thereof. The communications manager 920 may be an example of aspects of a communications manager 820 as described herein. In some examples, the communications manager 920, or various components thereof, may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communications at a UE in accordance with examples as disclosed herein. The TDD pattern reception manager 925 may be configured as or otherwise support a means for receiving control information indicative of a set of multiple TDD patterns, where a first dedicated TDD pattern of the set of multiple TDD patterns is for TDD communications between the UE and a first TRP from a set of mTRPs associated with a network entity. The TDD pattern determination manager 930 may be configured as or otherwise support a means for determining at least a second dedicated TDD pattern for TDD communications between the UE and at least a second TRP from the set of mTRPs based on the set of multiple TDD patterns. The TRP communication manager 935 may be configured as or otherwise support a means for communicating with the network entity via at least one of the first TRP or the second TRP in accordance with the first dedicated TDD pattern, the second dedicated TDD pattern, or both.

Figure 10:
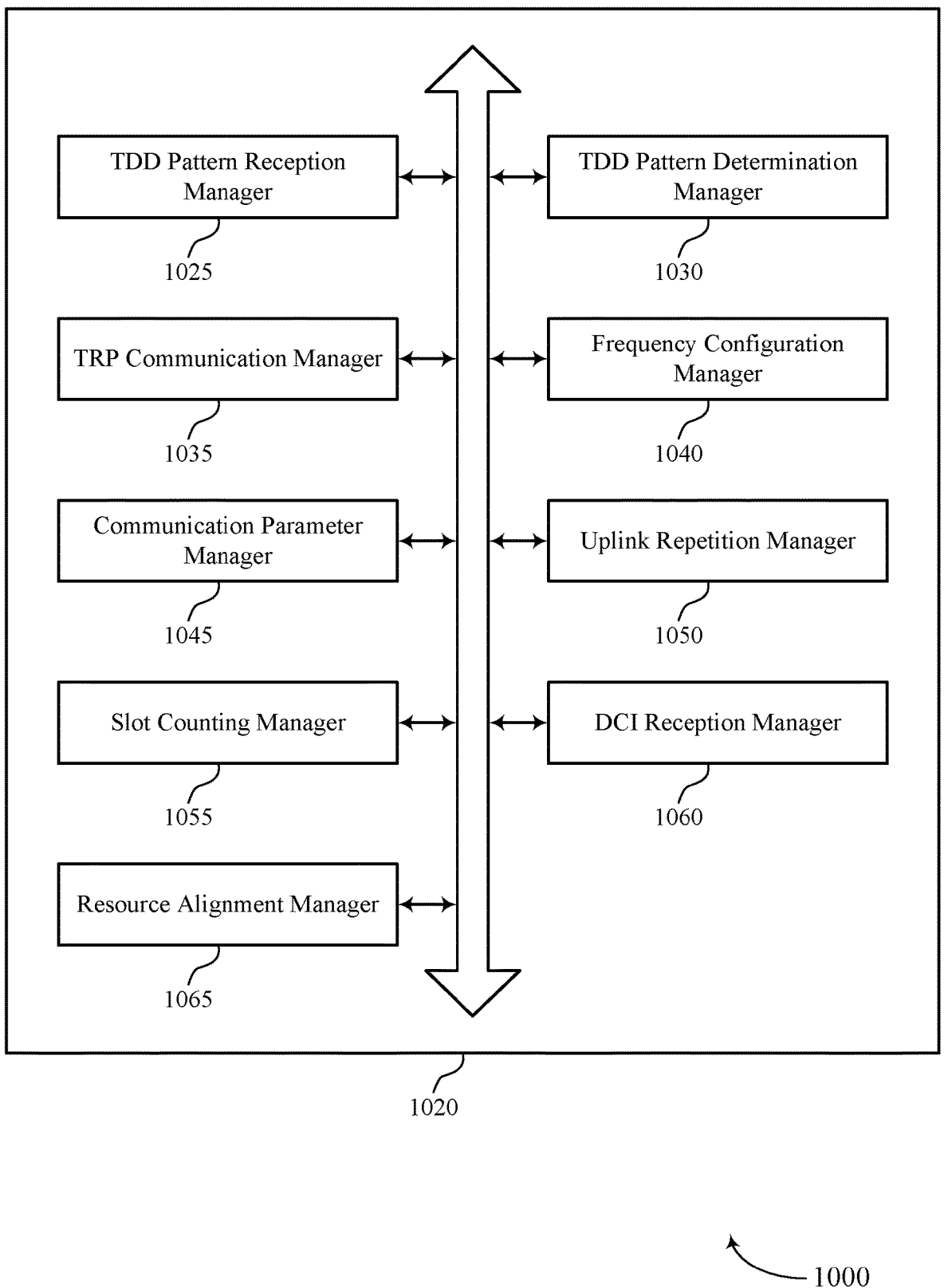
FIG. 10 shows a block diagram of a communications manager that supports techniques for implementing full-duplex communications via mTRPs in accordance with one or more aspects of the present disclosure.

FIG. 10 shows a block diagram 1000 of a communications manager 1020 that supports techniques for implementing full-duplex communications via mTRPs in accordance with one or more aspects of the present disclosure. The communications manager 1020 may be an example of aspects of a communications manager 820, a communications manager 920, or both, as described herein. The communications manager 1020, or various components thereof, may be an example of means for performing various aspects of techniques for implementing full-duplex communications via mTRPs as described herein. For example, the communications manager 1020 may include a TDD pattern reception manager 1025, a TDD pattern determination manager 1030, an TRP communication manager 1035, a frequency configuration manager 1040, a communication parameter manager 1045, an uplink repetition manager 1050, a slot counting manager 1055, a DCI reception manager 1060, a resource alignment manager 1065, or any combination thereof. Each of these components may communicate, directly or indirectly, with one another (e.g., via one or more buses).

The communications manager 1020 may support wireless communications at a UE in accordance with examples as disclosed herein. The TDD pattern reception manager 1025 may be configured as or otherwise support a means for receiving control information indicative of a set of multiple TDD patterns, where a first dedicated TDD pattern of the set of multiple TDD patterns is for TDD communications between the UE and a first TRP from a set of mTRPs associated with a network entity. The TDD pattern determination manager 1030 may be configured as or otherwise support a means for determining at least a second dedicated TDD pattern for TDD communications between the UE and at least a second TRP from the set of mTRPs based on the set of multiple TDD patterns. The TRP communication manager 1035 may be configured as or otherwise support a means for communicating with the network entity via at least one of the first TRP or the second TRP in accordance with the first dedicated TDD pattern, the second dedicated TDD pattern, or both.

In some examples, the frequency configuration manager 1040 may be configured as or otherwise support a means for receiving additional control information indicative of an allocation of frequency resources for one or more slots. In some examples, the frequency configuration manager 1040 may be configured as or otherwise support a means for determining one or more frequency-specific TDD patterns for the communicating with the network entity, where the one or more frequency-specific TDD patterns are based on the additional control information and at least one of the first dedicated TDD pattern or the second dedicated TDD pattern.

In some examples, the additional control information is indicative of whether a slot is configured for half-duplex communications, full duplex communications in which mTRPs are allocated a same set of frequency resources, sub-band full duplex communications, or whether there is partial overlap of uplink resources and downlink resources in an in-band full-duplex slot.

In some examples, the additional control information indicates a first allocation of frequency resources from a set of allocations of frequency resources.

In some examples, to support communicating with the network entity, the TRP communication manager 1035 may be configured as or otherwise support a means for receiving one or more first messages from the first TRP in a full-duplex slot in accordance with the first dedicated TDD pattern. In some examples, to support communicating with the network entity, the TRP communication manager 1035 may be configured as or otherwise support a means for transmitting, simultaneously with receiving the one or more first messages, one or more second messages to the second TRP in the full-duplex slot in accordance with the second dedicated TDD pattern.

In some examples, the communication parameter manager 1045 may be configured as or otherwise support a means for identifying a first set of communication parameters associated with the first dedicated TDD pattern and a second set of communication parameters associated with the second dedicated TDD pattern. In some examples, the TRP communication manager 1035 may be configured as or otherwise support a means for communicating via the first TRP and the second TRP by switching between the first set of communication parameters and the second set of communication parameters in accordance with the respective first dedicated TDD pattern and the second dedicated TDD pattern.

In some examples, the first set of communication parameters and the second set of communication parameters each include a transmission configuration indicator state, a control resource set pool index, one or more beam control parameters, one or more power control parameters, one or more timing advance parameters, or a combination thereof.

In some examples, the uplink repetition manager 1050 may be configured as or otherwise support a means for receiving an indication of an uplink repetition sequence associated with the first TRP and the second TRP, where communicating with the network entity is based on the uplink repetition sequence.

In some examples, the resource alignment manager 1065 may be configured as or otherwise support a means for identifying that the uplink repetition sequence aligns with the first dedicated TDD pattern and the second dedicated TDD pattern, where the UE communicates with the network entity in accordance with the uplink repetition sequence, the first dedicated TDD pattern, and the second dedicated TDD pattern.

In some examples, the resource alignment manager 1065 may be configured as or otherwise support a means for identifying that one or more repetitions of the uplink repetition sequence fail to align with the first dedicated TDD pattern, the second dedicated TDD pattern, or both.

In some examples, the resource alignment manager 1065 may be configured as or otherwise support a means for refraining to transmit the one or more repetitions of the uplink repetition sequence based on the one or more repetitions failing to align with the first dedicated TDD pattern, the second dedicated TDD pattern, or both.

In some examples, the resource alignment manager 1065 may be configured as or otherwise support a means for transmitting the one or more repetitions of the uplink repetition sequence irrespective of the one or more repetitions failing to align with the first dedicated TDD pattern, the second dedicated TDD pattern, or both.

In some examples, the uplink repetition sequence indicates a number of repetitions of an uplink message in accordance with a cyclic mapping, or a sequential mapping. In some examples, repetitions of the uplink repetition sequence alternate between the first TRP and the second TRP.

In some examples, the slot counting manager 1055 may be configured as or otherwise support a means for performing slot counting for the first TRP, the second TRP, or both based on a common TDD pattern of the set of multiple TDD patterns for TDD communications associated with the network entity.

In some examples, the resource alignment manager 1065 may be configured as or otherwise support a means for identifying a scheduling conflict between one or more scheduled messages and the first dedicated TDD pattern based on the slot counting.

In some examples, the resource alignment manager 1065 may be configured as or otherwise support a means for refraining to transmit the one or more scheduled messages based on the scheduling conflict.

In some examples, the resource alignment manager 1065 may be configured as or otherwise support a means for transmitting the one or more scheduled messages irrespective of the scheduling conflict.

In some examples, the slot counting manager 1055 may be configured as or otherwise support a means for performing slot counting for the first TRP, the second TRP, or both based on a respective dedicated TDD patterns associated with each of the first and second TRPs.

In some examples, the set of multiple TDD patterns includes the second dedicated TDD pattern for communications between the UE and at least the second TRP. In some examples, determining at least the second dedicated TDD pattern is based on receiving the control information indicative of the second dedicated TDD pattern.

In some examples, the set of multiple TDD patterns includes a common TDD pattern for TDD communications associated with the network entity.

In some examples, to support determining the second dedicated TDD pattern, the TDD pattern determination manager 1030 may be configured as or otherwise support a means for determining the second dedicated TDD pattern based on the first dedicated TDD pattern and the common TDD pattern.

In some examples, each TDD pattern of the set of multiple TDD patterns includes one or more full-duplexing slots, one or more half-duplexing slots, or a both.

In some examples, to support communicating with the network entity, the TRP communication manager 1035 may be configured as or otherwise support a means for receiving one or more messages from the first TRP, the second TRP, or both in a half-duplex downlink slot, or a full-duplex slot in accordance with the set of multiple TDD patterns.

In some examples, to support communicating with the network entity, the TRP communication manager 1035 may be configured as or otherwise support a means for transmitting one or more messages to the first TRP, the second TRP, or both in a half-duplex uplink slot, or a full-duplex slot in accordance with the set of multiple TDD patterns.

In some examples, the DCI reception manager 1060 may be configured as or otherwise support a means for receiving a first downlink control information message indicative of scheduling information for the first TRP. In some examples, the DCI reception manager 1060 may be configured as or otherwise support a means for receiving a second downlink control information message indicative of scheduling information for the second TRP, where communicating with the network entity is based on receiving the first downlink control information message and the second downlink control information message.

In some examples, the DCI reception manager 1060 may be configured as or otherwise support a means for receiving a single downlink control information message indicative of scheduling information for the first TRP and the second TRP, where communicating with the network entity is based on receiving the single downlink control information message.

Figure 11:
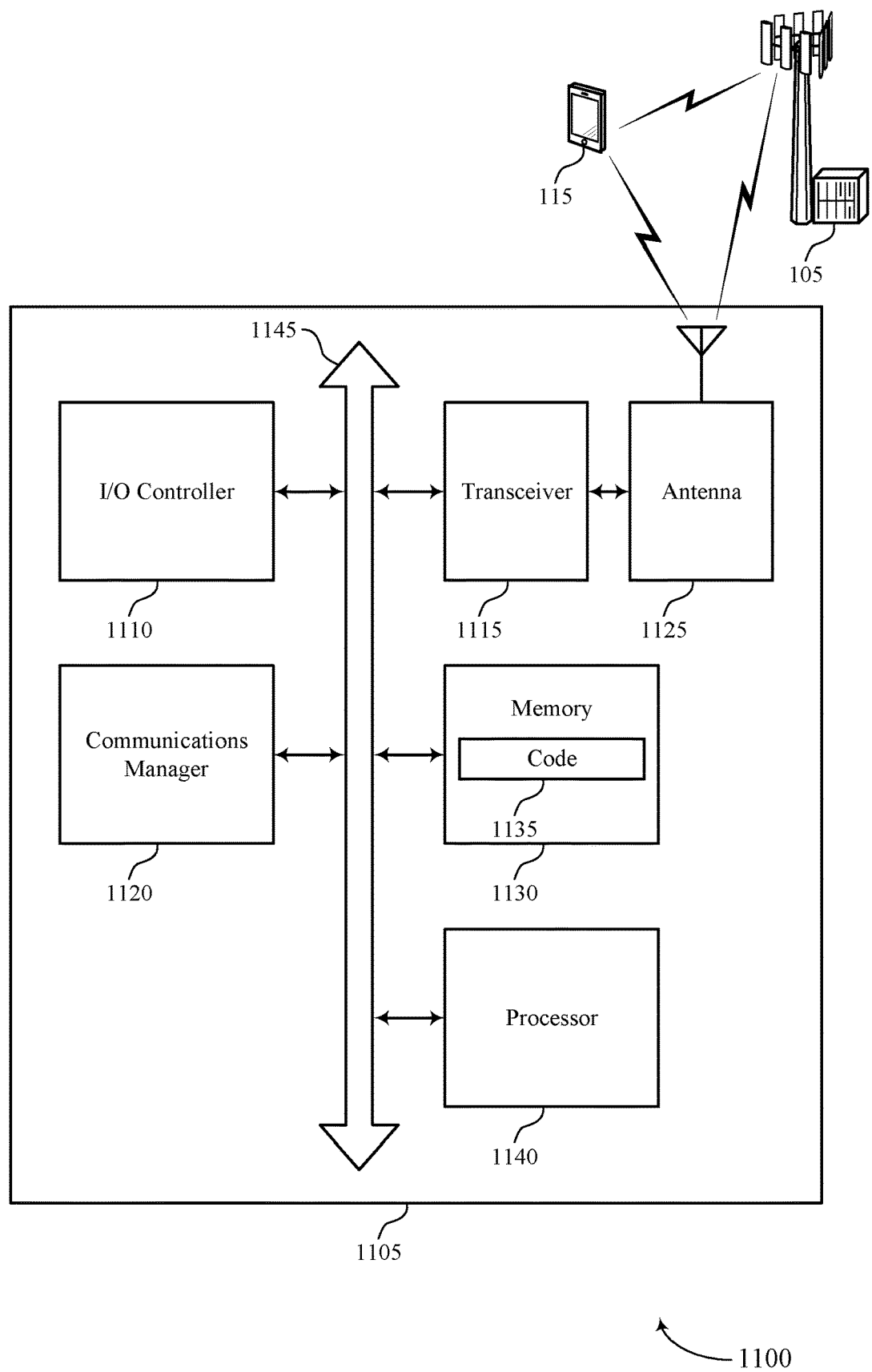
FIG. 11 shows a diagram of a system including a device that supports techniques for implementing full-duplex communications via mTRPs in accordance with one or more aspects of the present disclosure.

FIG. 11 shows a diagram of a system 1100 including a device 1105 that supports techniques for implementing full-duplex communications via mTRPs in accordance with one or more aspects of the present disclosure. The device 1105 may be an example of or include the components of a device 805, a device 905, or a UE 115 as described herein. The device 1105 may communicate (e.g., wirelessly) with one or more network entities 105, one or more UEs 115, or any combination thereof. The device 1105 may include components for bi-directional voice and data communications including components for transmitting and receiving communications, such as a communications manager 1120, an input/output (I/O) controller 1110, a transceiver 1115, an antenna 1125, a memory 1130, code 1135, and a processor 1140. These components may be in electronic communication or otherwise coupled (e.g., operatively, communicatively, functionally, electronically, electrically) via one or more buses (e.g., a bus 1145).

The I/O controller 1110 may manage input and output signals for the device 1105. The I/O controller 1110 may also manage peripherals not integrated into the device 1105. In some cases, the I/O controller 1110 may represent a physical connection or port to an external peripheral. In some cases, the I/O controller 1110 may utilize an operating system such as iOS®, ANDROID®, MS-DOS®, MS-WINDOWS®, OS/2®, UNIX®, LINUX®, or another known operating system. Additionally, or alternatively, the I/O controller 1110 may represent or interact with a modem, a keyboard, a mouse, a touchscreen, or a similar device. In some cases, the I/O controller 1110 may be implemented as part of a processor, such as the processor 1140. In some cases, a user may interact with the device 1105 via the I/O controller 1110 or via hardware components controlled by the I/O controller 1110.

In some cases, the device 1105 may include a single antenna 1125. However, in some other cases, the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The memory 1130 may include random access memory (RAM) and read-only memory (ROM). The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a basic I/O system (BIOS) which may control basic hardware or software operation such as the interaction with peripheral components or devices.

The processor 1140 may include an intelligent hardware device (e.g., a general-purpose processor, a DSP, a CPU, a GPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting techniques for implementing full-duplex communications via mTRPs). For example, the device 1105 or a component of the device 1105 may include a processor 1140 and memory 1130 coupled with or to the processor 1140, the processor 1140 and memory 1130 configured to perform various functions described herein.

The communications manager 1120 may support wireless communications at a UE in accordance with examples as disclosed herein. For example, the communications manager 1120 may be configured as or otherwise support a means for receiving control information indicative of a set of multiple TDD patterns, where a first dedicated TDD pattern of the set of multiple TDD patterns is for TDD communications between the UE and a first TRP from a set of mTRPs associated with a network entity. The communications manager 1120 may be configured as or otherwise support a means for determining at least a second dedicated TDD pattern for TDD communications between the UE and at least a second TRP from the set of mTRPs based on the set of multiple TDD patterns. The communications manager 1120 may be configured as or otherwise support a means for communicating with the network entity via at least one of the first TRP or the second TRP in accordance with the first dedicated TDD pattern, the second dedicated TDD pattern, or both.

By including or configuring the communications manager 1120 in accordance with examples as described herein, the device 1105 may support techniques for improved communication reliability, reduced latency, more efficient utilization of communication resources, and improved coordination between devices.

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of techniques for implementing full-duplex communications via mTRPs as described herein, or the processor 1140 and the memory 1130 may be otherwise configured to perform or support such operations.

Figure 12:
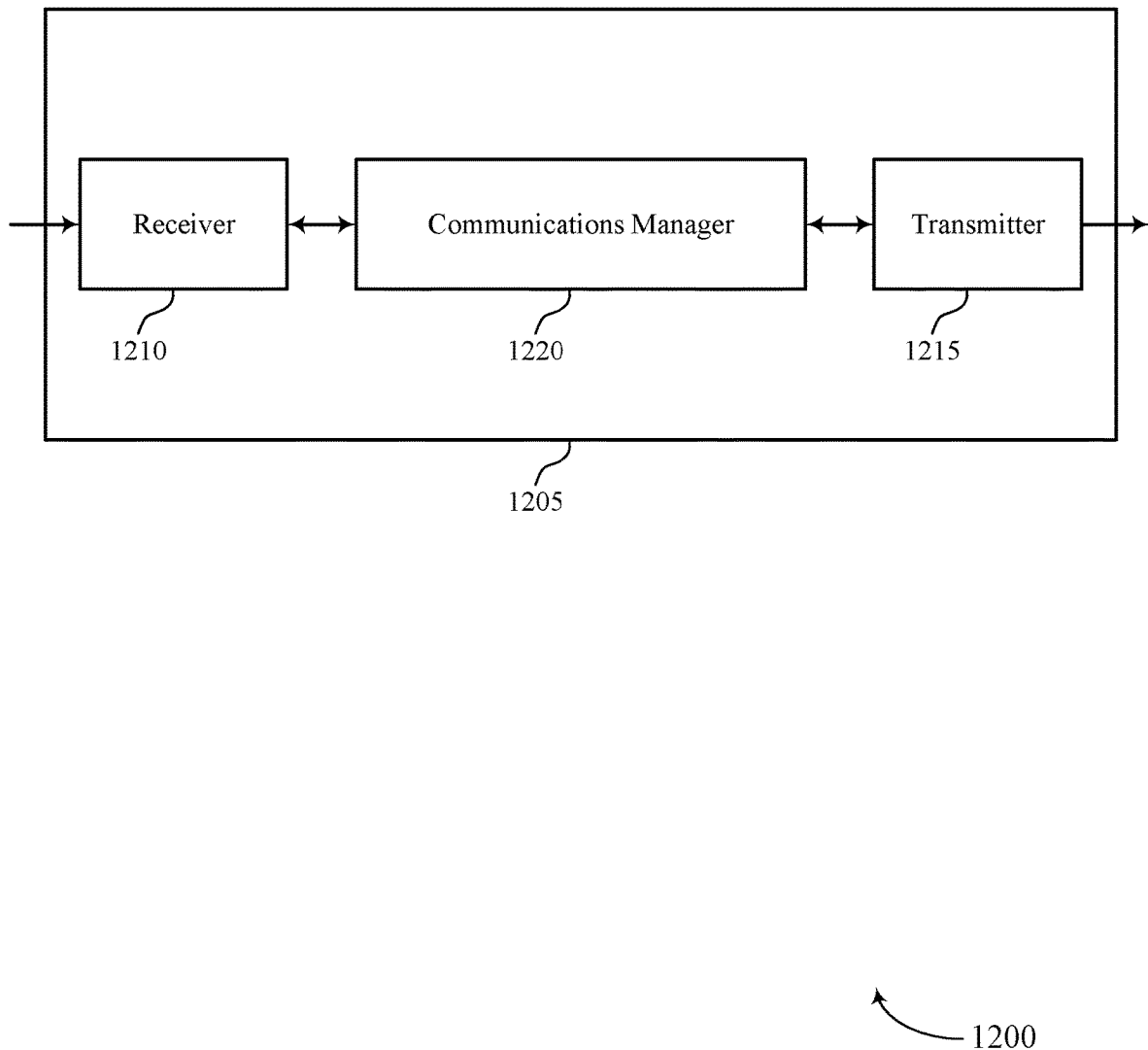
FIGS. 12 and 13 show block diagrams of devices that support techniques for implementing full-duplex communications via mTRPs in accordance with one or more aspects of the present disclosure.

FIG. 12 shows a block diagram 1200 of a device 1205 that supports techniques for implementing full-duplex communications via mTRPs in accordance with one or more aspects of the present disclosure. The device 1205 may be an example of aspects of a network entity 105 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1205. In some examples, the receiver 1210 may support obtaining information by receiving signals via one or more antennas. Additionally, or alternatively, the receiver 1210 may support obtaining information by receiving signals via one or more wired (e.g., electrical, fiber optic) interfaces, wireless interfaces, or any combination thereof.

The transmitter 1215 may provide a means for outputting (e.g., transmitting, providing, conveying, sending) information generated by other components of the device 1205. For example, the transmitter 1215 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1215 may support outputting information by transmitting signals via one or more antennas. Additionally, or alternatively, the transmitter 1215 may support outputting information by transmitting signals via one or more wired (e.g., electrical, fiber optic) interfaces, wireless interfaces, or any combination thereof. In some examples, the transmitter 1215 and the receiver 1210 may be co-located in a transceiver, which may include or be coupled with a modem.

The communications manager 1220, the receiver 1210, the transmitter 1215, or various combinations thereof or various components thereof may be examples of means for performing various aspects of techniques for implementing full-duplex communications via mTRPs as described herein. For example, the communications manager 1220, the receiver 1210, the transmitter 1215, or various combinations or components thereof may support a method for performing one or more of the functions described herein.

In some examples, the communications manager 1220, the receiver 1210, the transmitter 1215, or various combinations or components thereof may be implemented in hardware (e.g., in communications management circuitry). The hardware may include a processor, a DSP, a CPU, a GPU, an ASIC, an FPGA or other programmable logic device, a microcontroller, discrete gate or transistor logic, discrete hardware components, or any combination thereof configured as or otherwise supporting a means for performing the functions described in the present disclosure. Software shall be construed broadly to mean instructions, instruction sets, code, code segments, program code, programs, subprograms, software modules, applications, software applications, software packages, routines, subroutines, objects, executables, threads of execution, procedures, or functions, etc., whether referred to as software, firmware, middleware, microcode, hardware description language, or otherwise. In some examples, a processor and memory coupled with the processor may be configured to perform one or more of the functions described herein (e.g., by executing, by the processor, instructions stored in the memory).

Additionally, or alternatively, in some examples, the communications manager 1220, the receiver 1210, the transmitter 1215, or various combinations or components thereof may be implemented in code (e.g., as communications management software) executed by a processor. If implemented in code executed by a processor, the functions of the communications manager 1220, the receiver 1210, the transmitter 1215, or various combinations or components thereof may be performed by a general-purpose processor, a DSP, a CPU, a GPU, an ASIC, an FPGA, a microcontroller, or any combination of these or other programmable logic devices (e.g., configured as or otherwise supporting a means for performing the functions described in the present disclosure).

In some examples, the communications manager 1220 may be configured to perform various operations (e.g., receiving, obtaining, monitoring, outputting, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to obtain information, output information, or perform various other operations as described herein.

The communications manager 1220 may support wireless communications at a network entity in accordance with examples as disclosed herein. For example, the communications manager 1220 may be configured as or otherwise support a means for identifying at least a first dedicated TDD pattern for TDD communications between a UE and a first TRP from a set of mTRPs associated with the network entity and a second dedicated TDD pattern for TDD communications between the UE and a second TRP from the set of mTRPs associated with the network entity. The communications manager 1220 may be configured as or otherwise support a means for transmitting control information indicative of a set of multiple TDD patterns, where the set of multiple TDD patterns includes at least the first dedicated TDD pattern. The communications manager 1220 may be configured as or otherwise support a means for communicating with the UE via at least one of the first TRP or the second TRP in accordance with the first dedicated TDD pattern, the second dedicated TDD pattern, or both.

By including or configuring the communications manager 1220 in accordance with examples as described herein, the device 1205 (e.g., a processor controlling or otherwise coupled with the receiver 1210, the transmitter 1215, the communications manager 1220, or a combination thereof) may support techniques for more efficient utilization of communication resources.

Figure 13:
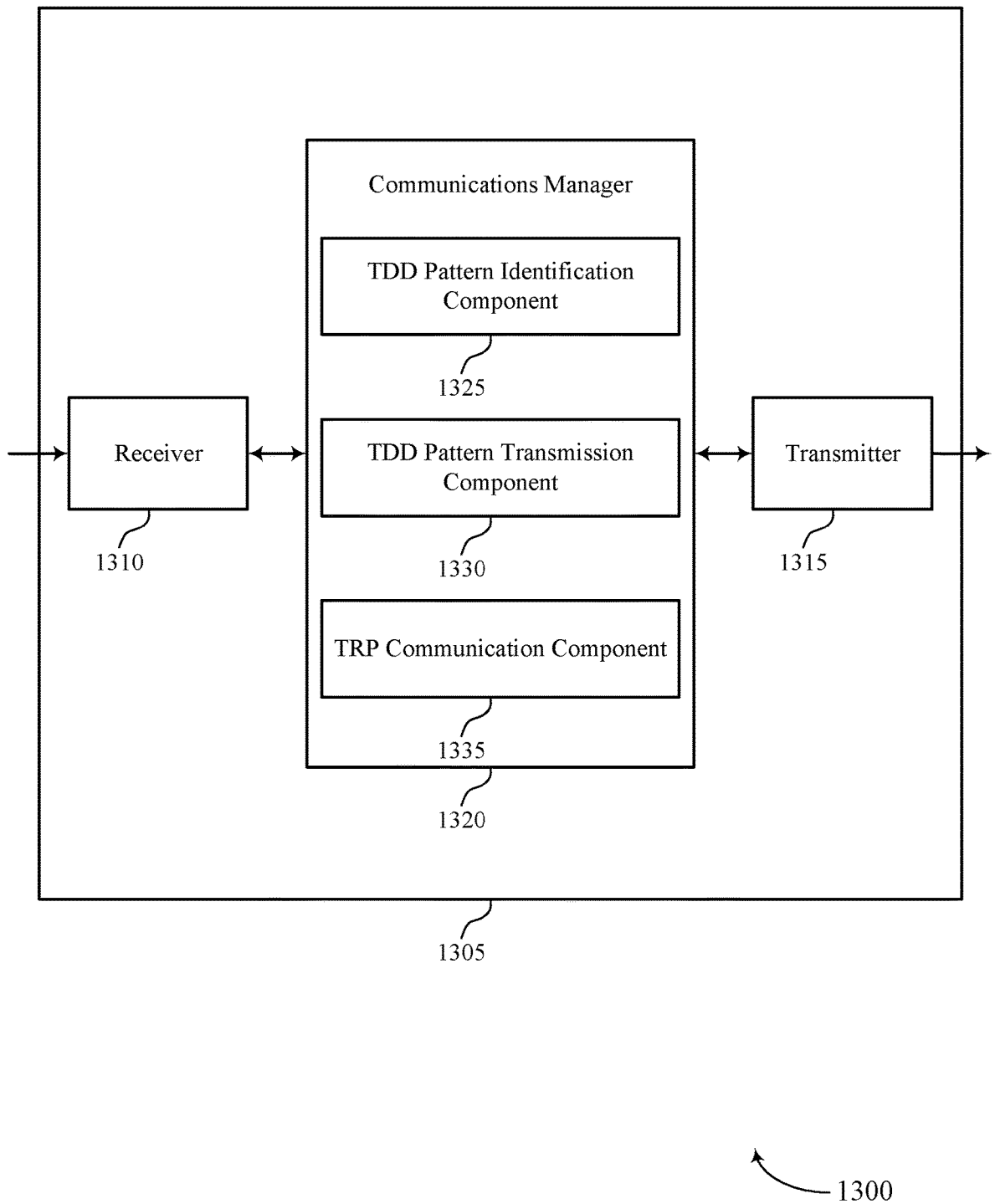

FIG. 13 shows a block diagram 1300 of a device 1305 that supports techniques for implementing full-duplex communications via mTRPs in accordance with one or more aspects of the present disclosure. The device 1305 may be an example of aspects of a device 1205 or a network entity 105 as described herein. The device 1305 may include a receiver 1310, a transmitter 1315, and a communications manager 1320. The device 1305 may also include a processor. Each of these components may be in communication with one another (e.g., via one or more buses).

The receiver 1310 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1305. In some examples, the receiver 1310 may support obtaining information by receiving signals via one or more antennas. Additionally, or alternatively, the receiver 1310 may support obtaining information by receiving signals via one or more wired (e.g., electrical, fiber optic) interfaces, wireless interfaces, or any combination thereof.

The transmitter 1315 may provide a means for outputting (e.g., transmitting, providing, conveying, sending) information generated by other components of the device 1305. For example, the transmitter 1315 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1315 may support outputting information by transmitting signals via one or more antennas. Additionally, or alternatively, the transmitter 1315 may support outputting information by transmitting signals via one or more wired (e.g., electrical, fiber optic) interfaces, wireless interfaces, or any combination thereof. In some examples, the transmitter 1315 and the receiver 1310 may be co-located in a transceiver, which may include or be coupled with a modem.

The device 1305, or various components thereof, may be an example of means for performing various aspects of techniques for implementing full-duplex communications via mTRPs as described herein. For example, the communications manager 1320 may include a TDD pattern identification component 1325, a TDD pattern transmission component 1330, an TRP communication component 1335, or any combination thereof. The communications manager 1320 may be an example of aspects of a communications manager 1220 as described herein. In some examples, the communications manager 1320, or various components thereof, may be configured to perform various operations (e.g., receiving, obtaining, monitoring, outputting, transmitting) using or otherwise in cooperation with the receiver 1310, the transmitter 1315, or both. For example, the communications manager 1320 may receive information from the receiver 1310, send information to the transmitter 1315, or be integrated in combination with the receiver 1310, the transmitter 1315, or both to obtain information, output information, or perform various other operations as described herein.

The communications manager 1320 may support wireless communications at a network entity in accordance with examples as disclosed herein. The TDD pattern identification component 1325 may be configured as or otherwise support a means for identifying at least a first dedicated TDD pattern for TDD communications between a UE and a first TRP from a set of mTRPs associated with the network entity and a second dedicated TDD pattern for TDD communications between the UE and a second TRP from the set of mTRPs associated with the network entity. The TDD pattern transmission component 1330 may be configured as or otherwise support a means for transmitting control information indicative of a set of multiple TDD patterns, where the set of multiple TDD patterns includes at least the first dedicated TDD pattern. The TRP communication component 1335 may be configured as or otherwise support a means for communicating with the UE via at least one of the first TRP or the second TRP in accordance with the first dedicated TDD pattern, the second dedicated TDD pattern, or both.

Figure 14:
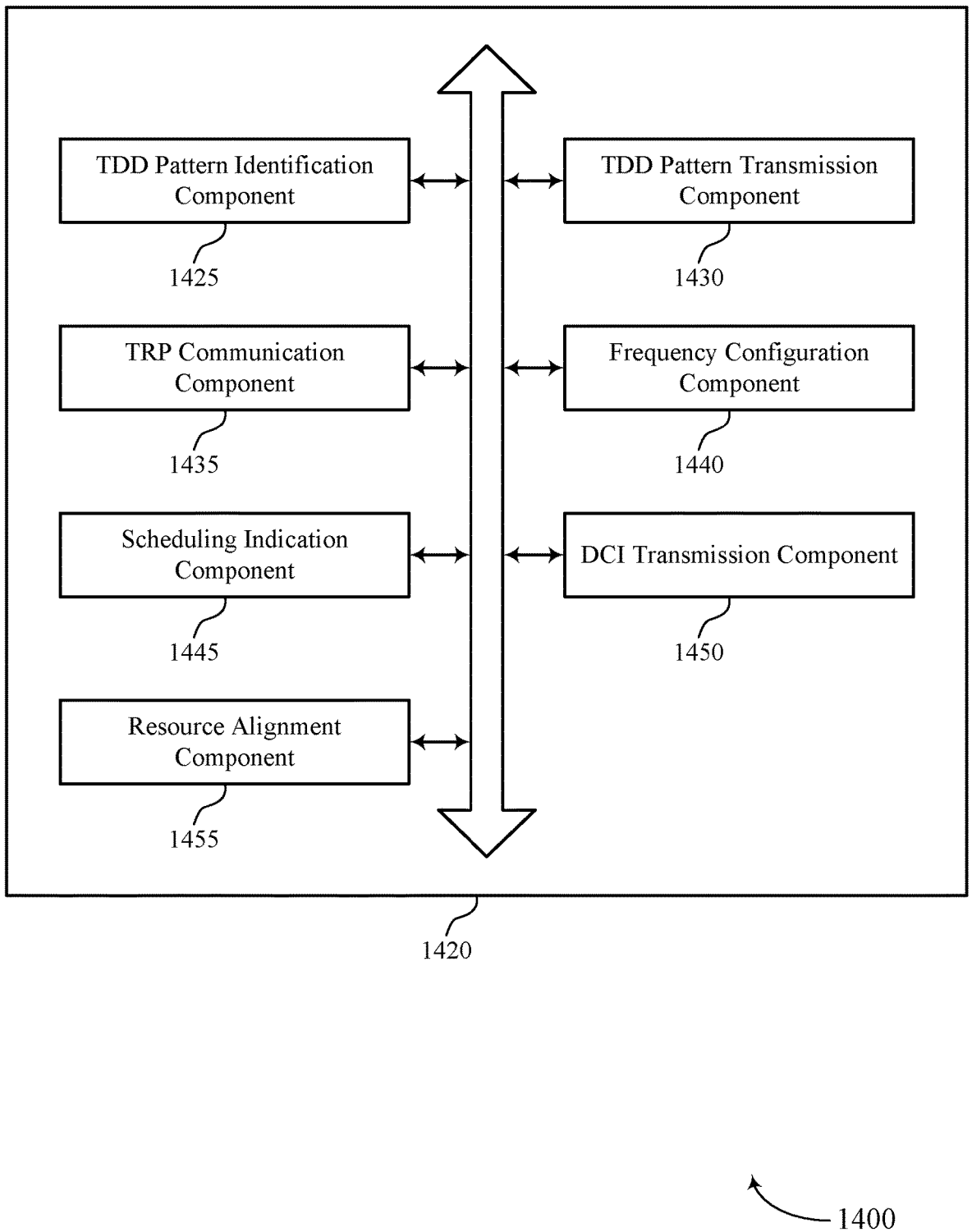
FIG. 14 shows a block diagram of a communications manager that supports techniques for implementing full-duplex communications via mTRPs in accordance with one or more aspects of the present disclosure.

FIG. 14 shows a block diagram 1400 of a communications manager 1420 that supports techniques for implementing full-duplex communications via mTRPs in accordance with one or more aspects of the present disclosure. The communications manager 1420 may be an example of aspects of a communications manager 1220, a communications manager 1320, or both, as described herein. The communications manager 1420, or various components thereof, may be an example of means for performing various aspects of techniques for implementing full-duplex communications via mTRPs as described herein. For example, the communications manager 1420 may include a TDD pattern identification component 1425, a TDD pattern transmission component 1430, an TRP communication component 1435, a frequency configuration component 1440, a scheduling indication component 1445, a DCI transmission component 1450, a resource alignment component 1455, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1420 may support wireless communications at a network entity in accordance with examples as disclosed herein. The TDD pattern identification component 1425 may be configured as or otherwise support a means for identifying at least a first dedicated TDD pattern for TDD communications between a UE and a first TRP from a set of mTRPs associated with the network entity and a second dedicated TDD pattern for TDD communications between the UE and a second TRP from the set of mTRPs associated with the network entity. The TDD pattern transmission component 1430 may be configured as or otherwise support a means for transmitting control information indicative of a set of multiple TDD patterns, where the set of multiple TDD patterns includes at least the first dedicated TDD pattern. The TRP communication component 1435 may be configured as or otherwise support a means for communicating with the UE via at least one of the first TRP or the second TRP in accordance with the first dedicated TDD pattern, the second dedicated TDD pattern, or both.

In some examples, the frequency configuration component 1440 may be configured as or otherwise support a means for transmitting additional control information indicative of an allocation of frequency resources for one or more slots. In some examples, the frequency configuration component 1440 may be configured as or otherwise support a means for determining one or more frequency-specific TDD patterns for the communicating with the UE, where the one or more frequency-specific TDD patterns are based on the additional control information and at least one of the first dedicated TDD pattern or the second dedicated TDD pattern.

In some examples, the additional control information is indicative of whether a slot is configured for half-duplex communications, full duplex communications in which mTRPs are allocated a same set of frequency resources, sub-band full duplex communications, or whether there is partial overlap of uplink resources and downlink resources in an in-band full-duplex slot.

In some examples, the additional control information indicates a first allocation of frequency resources from a set of allocations of frequency resources.

In some examples, to support communicating with the UE, the TRP communication component 1435 may be configured as or otherwise support a means for transmitting one or more first messages via the first TRP in a full-duplex slot in accordance with the first dedicated TDD pattern. In some examples, to support communicating with the UE, the TRP communication component 1435 may be configured as or otherwise support a means for receiving, simultaneously to transmitting the one or more first messages, one or more second messages via the second TRP in the full-duplex slot in accordance with the second dedicated TDD pattern.

In some examples, the scheduling indication component 1445 may be configured as or otherwise support a means for transmitting an indication of a scheduled message, an uplink repetition sequence, or both associated with the first TRP and the second TRP, where communicating with the UE is based on the uplink repetition sequence.

In some examples, the resource alignment component 1455 may be configured as or otherwise support a means for configuring the scheduled message, the uplink repetition sequence, or both such that the scheduled message, the uplink repetition sequence, or both aligns with the first dedicated TDD pattern and the second dedicated TDD pattern.

In some examples, the resource alignment component 1455 may be configured as or otherwise support a means for identifying a failure to receive the scheduled message, one or more repetitions of the uplink repetition sequence, or both, where the failure is based on the scheduled message, the one or more repetitions of the uplink repetition sequence, or both failing to align with the first dedicated TDD pattern, the second dedicated TDD pattern, or both.

In some examples, the resource alignment component 1455 may be configured as or otherwise support a means for receiving the scheduled message, a set of repetitions in accordance with the uplink repetition sequence, or both, where the scheduled message, one or more repetitions of the set of repetitions, or both fail to align with the first dedicated TDD pattern, the second dedicated TDD pattern, or both.

In some examples, the uplink repetition sequence indicates a number of repetitions of an uplink message in accordance with a cyclic mapping, or a sequential mapping. In some examples, repetitions of the uplink repetition sequence alternate between the first TRP and the second TRP.

In some examples, the set of multiple TDD patterns includes the second dedicated TDD pattern for communications between the UE and at least the second TRP.

In some examples, the set of multiple TDD patterns includes a common TDD pattern for TDD communications associated with the network entity.

In some examples, each TDD pattern of the set of multiple TDD patterns includes one or more full-duplexing slots, one or more half-duplexing slots, or a both.

In some examples, to support communicating with the UE, the TRP communication component 1435 may be configured as or otherwise support a means for transmitting one or more messages via the first TRP, the second TRP, or both in a half-duplex downlink slot, or a full-duplex slot in accordance with the set of multiple TDD patterns.

In some examples, to support communicating with the UE, the TRP communication component 1435 may be configured as or otherwise support a means for receiving one or more messages via the first TRP, the second TRP, or both in a half-duplex uplink slot, or a full-duplex slot in accordance with the set of multiple TDD patterns.

In some examples, the DCI transmission component 1450 may be configured as or otherwise support a means for transmitting a first downlink control information message indicative of scheduling information for the first TRP. In some examples, the DCI transmission component 1450 may be configured as or otherwise support a means for transmitting a second downlink control information message indicative of scheduling information for the second TRP, where communicating with the UE is based on transmitting the first downlink control information message and the second downlink control information message.

In some examples, the DCI transmission component 1450 may be configured as or otherwise support a means for transmitting a single downlink control information message indicative of scheduling information for the first TRP and the second TRP, where communicating with the UE is based on transmitting the single downlink control information message.

Figure 15:
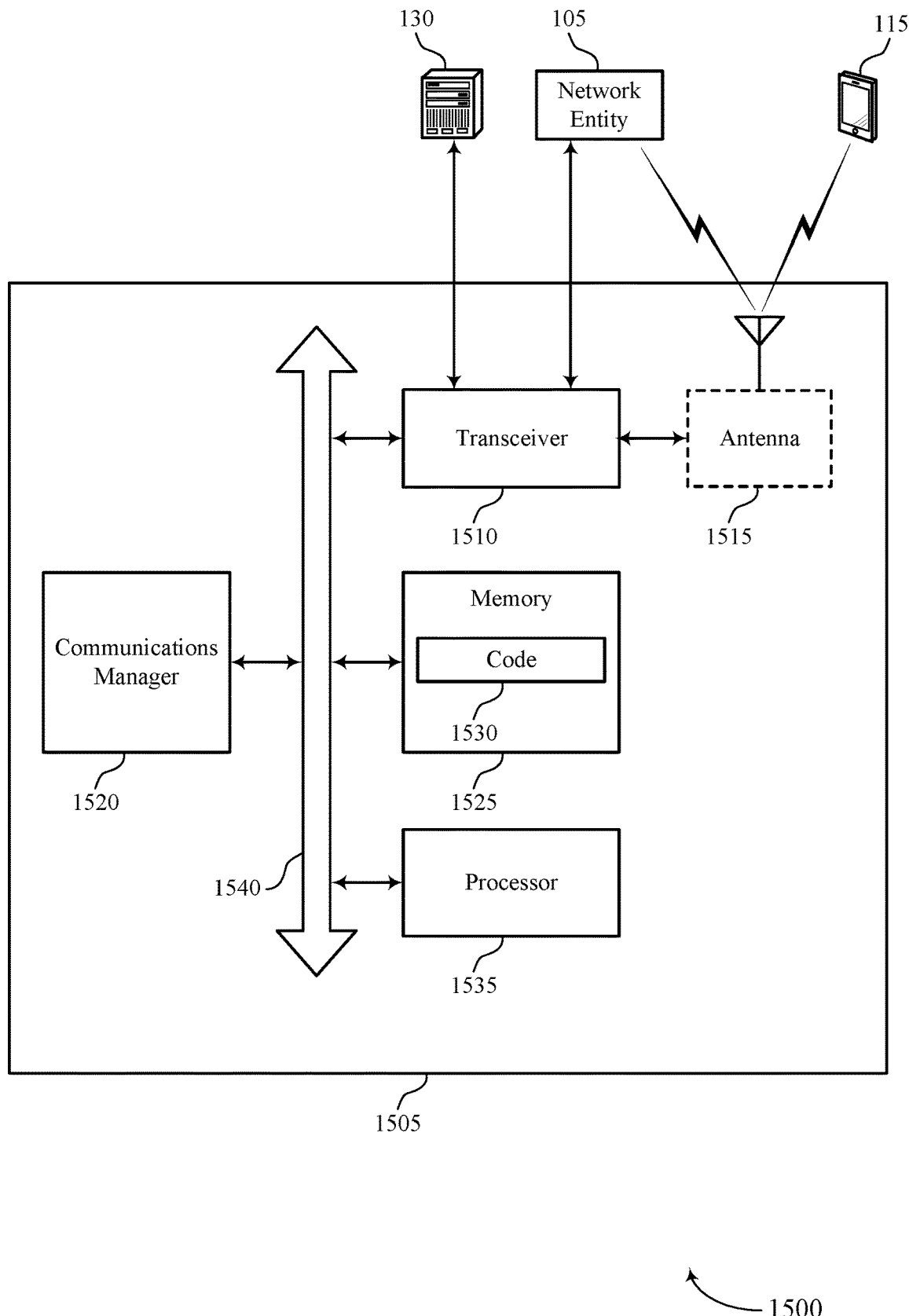
FIG. 15 shows a diagram of a system including a device that supports techniques for implementing full-duplex communications via mTRPs in accordance with one or more aspects of the present disclosure.

FIG. 15 shows a diagram of a system 1500 including a device 1505 that supports techniques for implementing full-duplex communications via mTRPs in accordance with one or more aspects of the present disclosure. The device 1505 may be an example of or include the components of a device 1205, a device 1305, or a network entity 105 as described herein. The device 1505 may communicate with one or more network entities 105, one or more UEs 115, or any combination thereof, which may include communications over one or more wired interfaces, over one or more wireless interfaces, or any combination thereof. The device 1505 may include components that support outputting and obtaining communications, such as a communications manager 1520, a transceiver 1510, an antenna 1515, a memory 1525, code 1530, and a processor 1535. These components may be in electronic communication or otherwise coupled (e.g., operatively, communicatively, functionally, electronically, electrically) via one or more buses (e.g., a bus 1540).

The transceiver 1510 may support bi-directional communications via wired links, wireless links, or both as described herein. In some examples, the transceiver 1510 may include a wired transceiver and may communicate bi-directionally with another wired transceiver. Additionally, or alternatively, in some examples, the transceiver 1510 may include a wireless transceiver and may communicate bi-directionally with another wireless transceiver. In some examples, the device 1505 may include one or more antennas 1515, which may be capable of transmitting or receiving wireless transmissions (e.g., concurrently). The transceiver 1510 may also include a modem to modulate signals, to provide the modulated signals for transmission (e.g., by one or more antennas 1515, by a wired transmitter), to receive modulated signals (e.g., from one or more antennas 1515, from a wired receiver), and to demodulate signals. The transceiver 1510, or the transceiver 1510 and one or more antennas 1515 or wired interfaces, where applicable, may be an example of a transmitter 1215, a transmitter 1315, a receiver 1210, a receiver 1310, or any combination thereof or component thereof, as described herein. In some examples, the transceiver may be operable to support communications via one or more communications links (e.g., a communication link 125, a backhaul communication link 120, a midhaul communication link 162, a fronthaul communication link 168).

The memory 1525 may include RAM and ROM. The memory 1525 may store computer-readable, computer-executable code 1530 including instructions that, when executed by the processor 1535, cause the device 1505 to perform various functions described herein. The code 1530 may be stored in a non-transitory computer-readable medium such as system memory or another type of memory. In some cases, the code 1530 may not be directly executable by the processor 1535 but may cause a computer (e.g., when compiled and executed) to perform functions described herein. In some cases, the memory 1525 may contain, among other things, a BIOS which may control basic hardware or software operation such as the interaction with peripheral components or devices.

The processor 1535 may include an intelligent hardware device (e.g., a general-purpose processor, a DSP, an ASIC, a CPU, a GPU, an FPGA, a microcontroller, a programmable logic device, discrete gate or transistor logic, a discrete hardware component, or any combination thereof). In some cases, the processor 1535 may be configured to operate a memory array using a memory controller. In some other cases, a memory controller may be integrated into the processor 1535. The processor 1535 may be configured to execute computer-readable instructions stored in a memory (e.g., the memory 1525) to cause the device 1505 to perform various functions (e.g., functions or tasks supporting techniques for implementing full-duplex communications via mTRPs). For example, the device 1505 or a component of the device 1505 may include a processor 1535 and memory 1525 coupled with the processor 1535, the processor 1535 and memory 1525 configured to perform various functions described herein. The processor 1535 may be an example of a cloud-computing platform (e.g., one or more physical nodes and supporting software such as operating systems, virtual machines, or container instances) that may host the functions (e.g., by executing code 1530) to perform the functions of the device 1505.

In some examples, a bus 1540 may support communications of (e.g., within) a protocol layer of a protocol stack. In some examples, a bus 1540 may support communications associated with a logical channel of a protocol stack (e.g., between protocol layers of a protocol stack), which may include communications performed within a component of the device 1505, or between different components of the device 1505 that may be co-located or located in different locations (e.g., where the device 1505 may refer to a system in which one or more of the communications manager 1520, the transceiver 1510, the memory 1525, the code 1530, and the processor 1535 may be located in one of the different components or divided between different components).

In some examples, the communications manager 1520 may manage aspects of communications with a core network 130 (e.g., via one or more wired or wireless backhaul links). For example, the communications manager 1520 may manage the transfer of data communications for client devices, such as one or more UEs 115. In some examples, the communications manager 1520 may manage communications with other network entities 105, and may include a controller or scheduler for controlling communications with UEs 115 in cooperation with other network entities 105. In some examples, the communications manager 1520 may support an X2 interface within an LTE/LTE-A wireless communications network technology to provide communication between network entities 105.

The communications manager 1520 may support wireless communications at a network entity in accordance with examples as disclosed herein. For example, the communications manager 1520 may be configured as or otherwise support a means for identifying at least a first dedicated TDD pattern for TDD communications between a UE and a first TRP from a set of mTRPs associated with the network entity and a second dedicated TDD pattern for TDD communications between the UE and a second TRP from the set of mTRPs associated with the network entity. The communications manager 1520 may be configured as or otherwise support a means for transmitting control information indicative of a set of multiple TDD patterns, where the set of multiple TDD patterns includes at least the first dedicated TDD pattern. The communications manager 1520 may be configured as or otherwise support a means for communicating with the UE via at least one of the first TRP or the second TRP in accordance with the first dedicated TDD pattern, the second dedicated TDD pattern, or both.

By including or configuring the communications manager 1520 in accordance with examples as described herein, the device 1505 may support techniques for improved communication reliability, reduced latency, more efficient utilization of communication resources, and improved coordination between devices.

In some examples, the communications manager 1520 may be configured to perform various operations (e.g., receiving, obtaining, monitoring, outputting, transmitting) using or otherwise in cooperation with the transceiver 1510, the one or more antennas 1515 (e.g., where applicable), or any combination thereof. Although the communications manager 1520 is illustrated as a separate component, in some examples, one or more functions described with reference to the communications manager 1520 may be supported by or performed by the processor 1535, the memory 1525, the code 1530, the transceiver 1510, or any combination thereof. For example, the code 1530 may include instructions executable by the processor 1535 to cause the device 1505 to perform various aspects of techniques for implementing full-duplex communications via mTRPs as described herein, or the processor 1535 and the memory 1525 may be otherwise configured to perform or support such operations.

Figure 16:
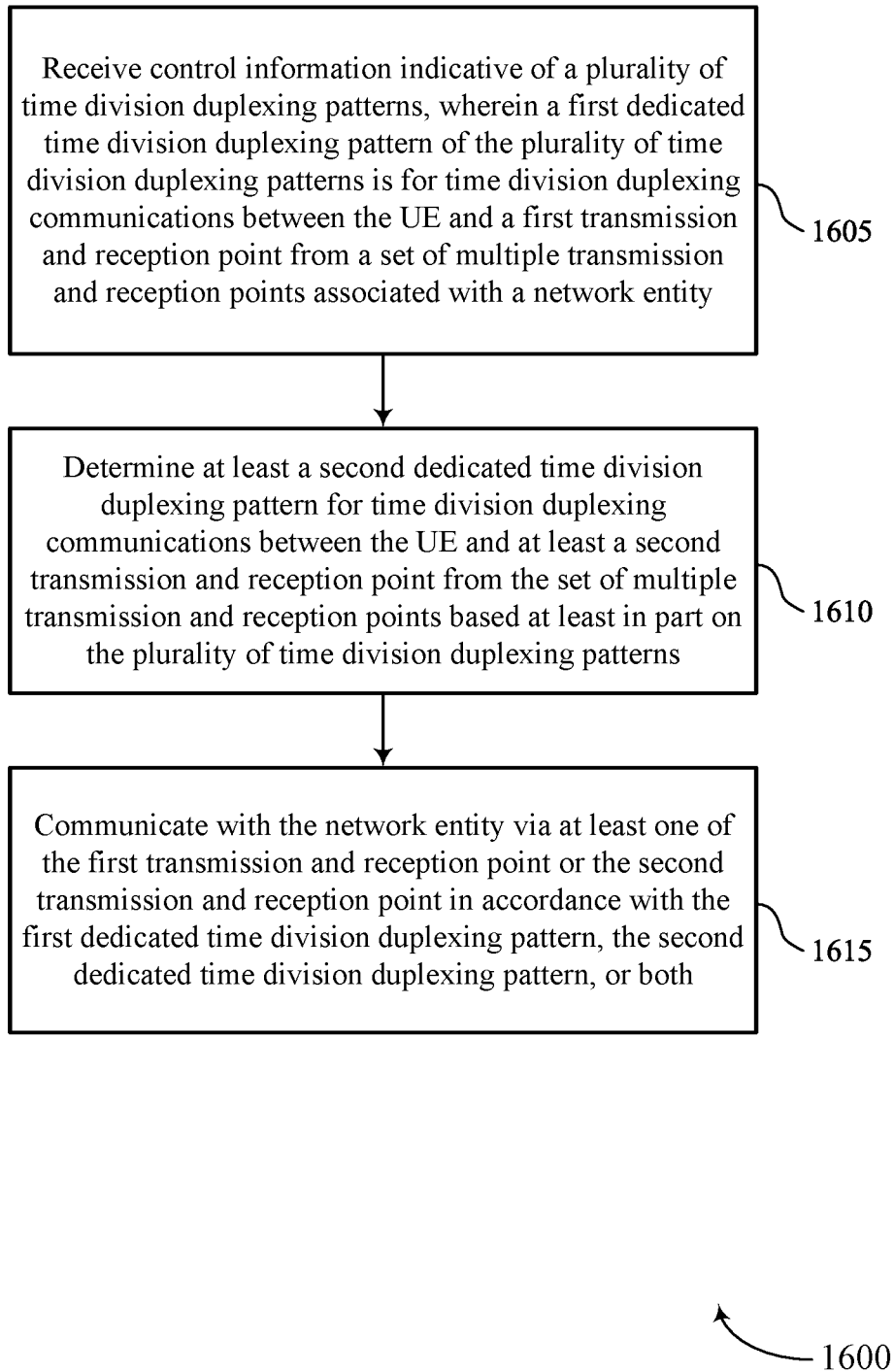
FIGS. 16 through 19 show flowcharts illustrating methods that support techniques for implementing full-duplex communications via mTRPs in accordance with one or more aspects of the present disclosure.

FIG. 16 shows a flowchart illustrating a method 1600 that supports techniques for implementing full-duplex communications via mTRPs in accordance with one or more aspects of the present disclosure. The operations of the method 1600 may be implemented by a UE or its components as described herein. For example, the operations of the method 1600 may be performed by a UE 115 as described with reference to FIGS. 1 through 11. In some examples, a UE may execute a set of instructions to control the functional elements of the UE to perform the described functions. Additionally, or alternatively, the UE may perform aspects of the described functions using special-purpose hardware.

At 1605, the method may include receiving control information indicative of a set of multiple TDD patterns, where a first dedicated TDD pattern of the set of multiple TDD patterns is for TDD communications between the UE and a first TRP from a set of mTRPs associated with a network entity. The operations of 1605 may be performed in accordance with examples as disclosed herein. In some examples, aspects of the operations of 1605 may be performed by a TDD pattern reception manager 1025 as described with reference to FIG. 10.

At 1610, the method may include determining at least a second dedicated TDD pattern for TDD communications between the UE and at least a second TRP from the set of mTRPs based on the set of multiple TDD patterns. The operations of 1610 may be performed in accordance with examples as disclosed herein. In some examples, aspects of the operations of 1610 may be performed by a TDD pattern determination manager 1030 as described with reference to FIG. 10.

At 1615, the method may include communicating with the network entity via at least one of the first TRP or the second TRP in accordance with the first dedicated TDD pattern, the second dedicated TDD pattern, or both. The operations of 1615 may be performed in accordance with examples as disclosed herein. In some examples, aspects of the operations of 1615 may be performed by an TRP communication manager 1035 as described with reference to FIG. 10.

Figure 17:
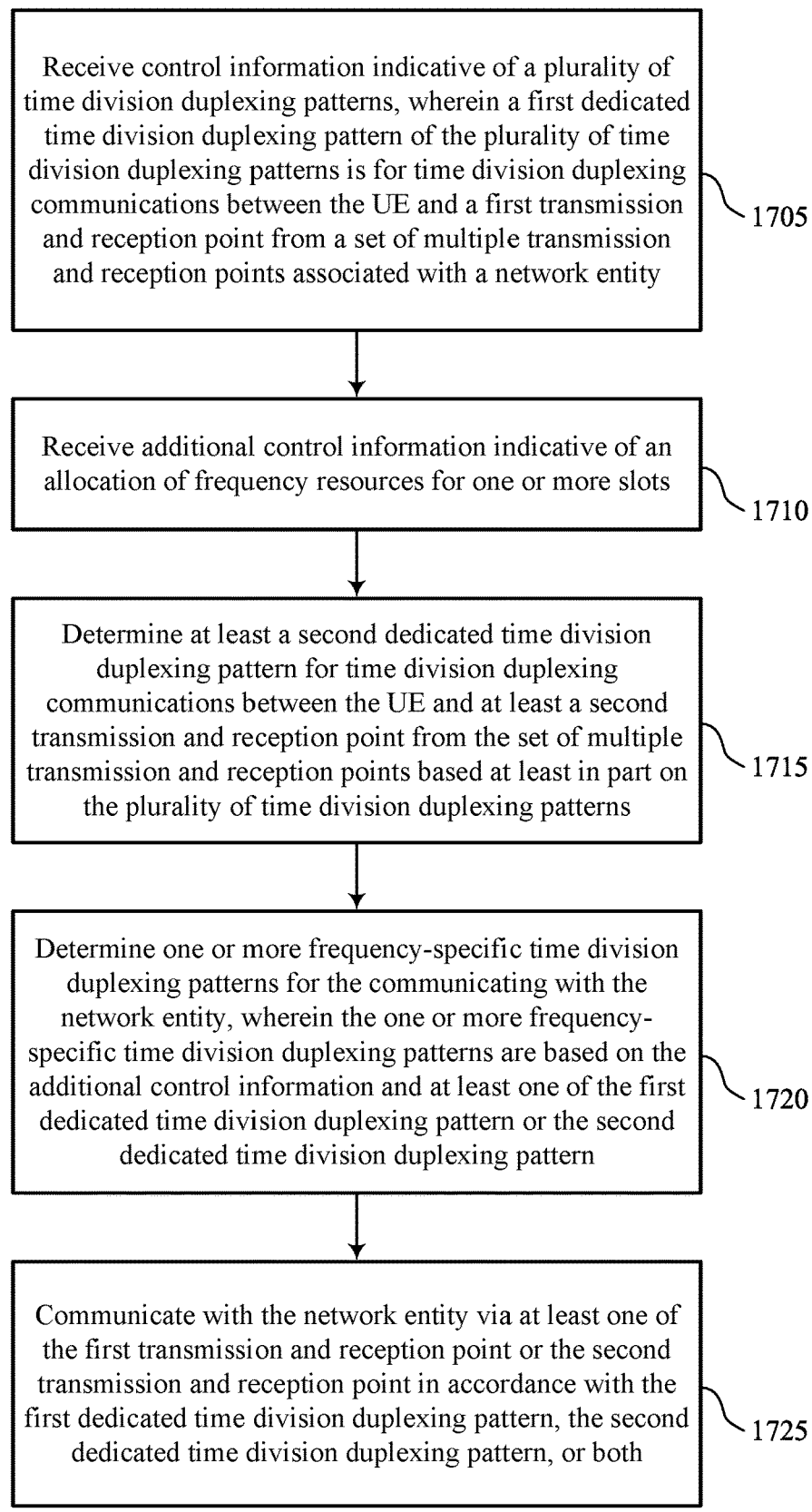

FIG. 17 shows a flowchart illustrating a method 1700 that supports techniques for implementing full-duplex communications via mTRPs in accordance with one or more aspects of the present disclosure. The operations of the method 1700 may be implemented by a UE or its components as described herein. For example, the operations of the method 1700 may be performed by a UE 115 as described with reference to FIGS. 1 through 11. In some examples, a UE may execute a set of instructions to control the functional elements of the UE to perform the described functions. Additionally, or alternatively, the UE may perform aspects of the described functions using special-purpose hardware.

At 1705, the method may include receiving control information indicative of a set of multiple TDD patterns, where a first dedicated TDD pattern of the set of multiple TDD patterns is for TDD communications between the UE and a first TRP from a set of mTRPs associated with a network entity. The operations of 1705 may be performed in accordance with examples as disclosed herein. In some examples, aspects of the operations of 1705 may be performed by a TDD pattern reception manager 1025 as described with reference to FIG. 10.

At 1710, the method may include receiving additional control information indicative of an allocation of frequency resources for one or more slots. The operations of 1710 may be performed in accordance with examples as disclosed herein. In some examples, aspects of the operations of 1710 may be performed by a frequency configuration manager 1040 as described with reference to FIG. 10.

At 1715, the method may include determining at least a second dedicated TDD pattern for TDD communications between the UE and at least a second TRP from the set of mTRPs based on the set of multiple TDD patterns. The operations of 1715 may be performed in accordance with examples as disclosed herein. In some examples, aspects of the operations of 1715 may be performed by a TDD pattern determination manager 1030 as described with reference to FIG. 10.

At 1720, the method may include determining one or more frequency-specific TDD patterns for the communicating with the network entity, where the one or more frequency-specific TDD patterns are based on the additional control information and at least one of the first dedicated TDD pattern or the second dedicated TDD pattern. The operations of 1720 may be performed in accordance with examples as disclosed herein. In some examples, aspects of the operations of 1720 may be performed by a frequency configuration manager 1040 as described with reference to FIG. 10.

At 1725, the method may include communicating with the network entity via at least one of the first TRP or the second TRP in accordance with the first dedicated TDD pattern, the second dedicated TDD pattern, or both. The operations of 1725 may be performed in accordance with examples as disclosed herein. In some examples, aspects of the operations of 1725 may be performed by an TRP communication manager 1035 as described with reference to FIG. 10.

Figure 18:
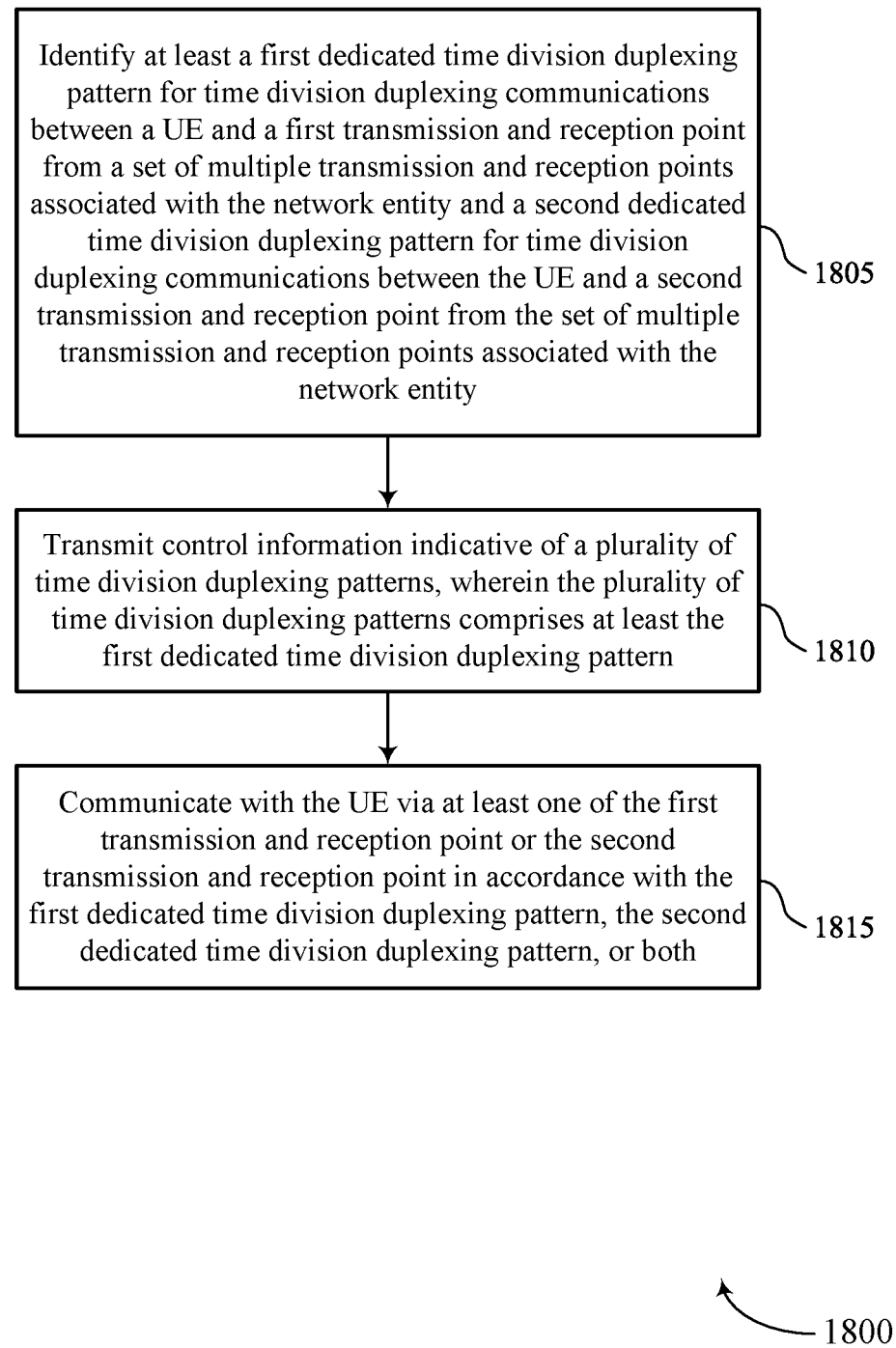

FIG. 18 shows a flowchart illustrating a method 1800 that supports techniques for implementing full-duplex communications via mTRPs in accordance with one or more aspects of the present disclosure. The operations of the method 1800 may be implemented by a network entity or its components as described herein. For example, the operations of the method 1800 may be performed by a network entity as described with reference to FIGS. 1 through 7 and 12 through 15. In some examples, a network entity may execute a set of instructions to control the functional elements of the network entity to perform the described functions. Additionally, or alternatively, the network entity may perform aspects of the described functions using special-purpose hardware.

At 1805, the method may include identifying at least a first dedicated TDD pattern for TDD communications between a UE and a first TRP from a set of mTRPs associated with the network entity and a second dedicated TDD pattern for TDD communications between the UE and a second TRP from the set of mTRPs associated with the network entity. The operations of 1805 may be performed in accordance with examples as disclosed herein. In some examples, aspects of the operations of 1805 may be performed by a TDD pattern identification component 1425 as described with reference to FIG. 14.

At 1810, the method may include transmitting control information indicative of a set of multiple TDD patterns, where the set of multiple TDD patterns includes at least the first dedicated TDD pattern. The operations of 1810 may be performed in accordance with examples as disclosed herein. In some examples, aspects of the operations of 1810 may be performed by a TDD pattern transmission component 1430 as described with reference to FIG. 14.

At 1815, the method may include communicating with the UE via at least one of the first TRP or the second TRP in accordance with the first dedicated TDD pattern, the second dedicated TDD pattern, or both. The operations of 1815 may be performed in accordance with examples as disclosed herein. In some examples, aspects of the operations of 1815 may be performed by an TRP communication component 1435 as described with reference to FIG. 14.

Figure 19:
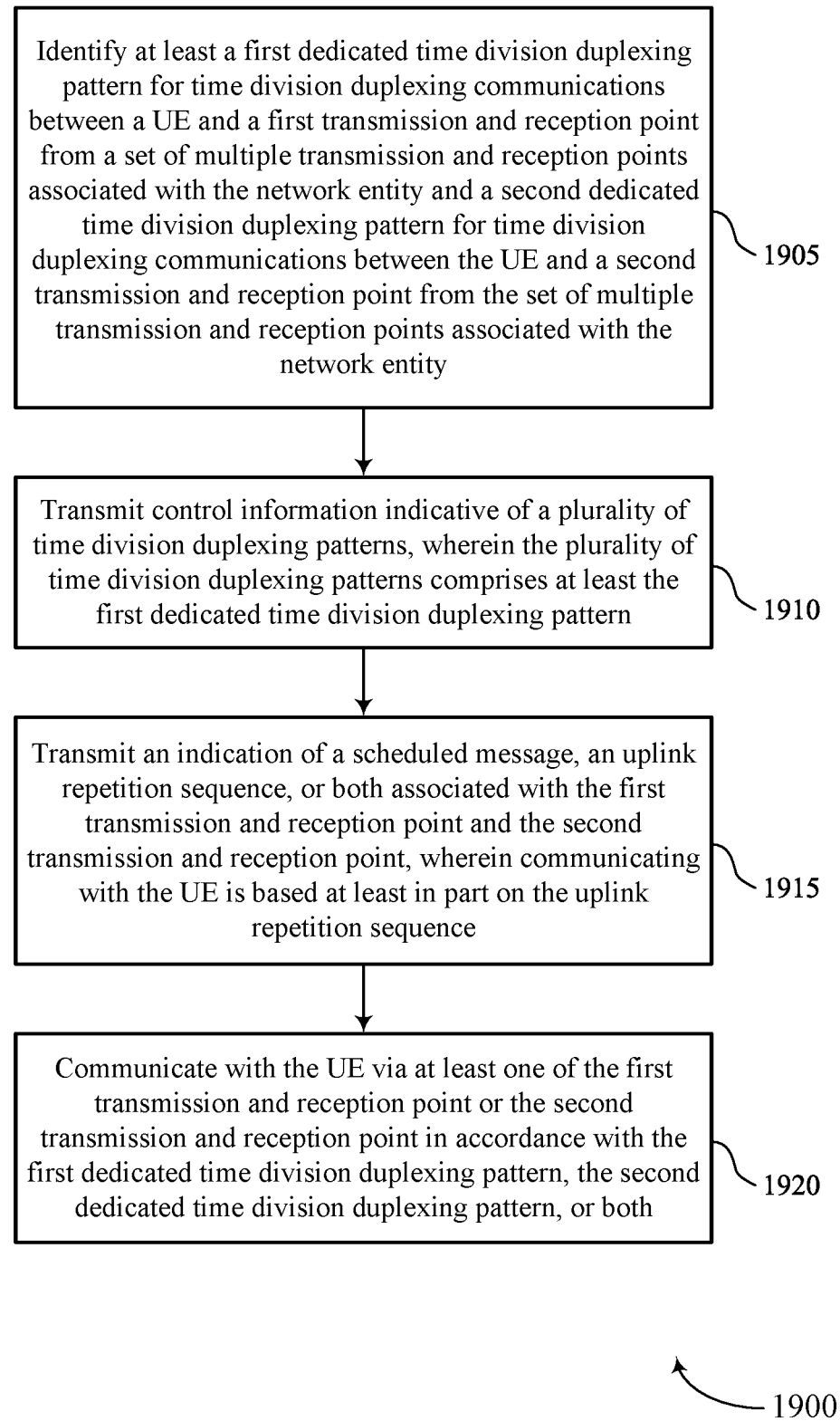

FIG. 19 shows a flowchart illustrating a method 1900 that supports techniques for implementing full-duplex communications via mTRPs in accordance with one or more aspects of the present disclosure. The operations of the method 1900 may be implemented by a network entity or its components as described herein. For example, the operations of the method 1900 may be performed by a network entity as described with reference to FIGS. 1 through 7 and 12 through 15. In some examples, a network entity may execute a set of instructions to control the functional elements of the network entity to perform the described functions. Additionally, or alternatively, the network entity may perform aspects of the described functions using special-purpose hardware.

At 1905, the method may include identifying at least a first dedicated TDD pattern for TDD communications between a UE and a first TRP from a set of mTRPs associated with the network entity and a second dedicated TDD pattern for TDD communications between the UE and a second TRP from the set of mTRPs associated with the network entity. The operations of 1905 may be performed in accordance with examples as disclosed herein. In some examples, aspects of the operations of 1905 may be performed by a TDD pattern identification component 1425 as described with reference to FIG. 14.

At 1910, the method may include transmitting control information indicative of a set of multiple TDD patterns, where the set of multiple TDD patterns includes at least the first dedicated TDD pattern. The operations of 1910 may be performed in accordance with examples as disclosed herein. In some examples, aspects of the operations of 1910 may be performed by a TDD pattern transmission component 1430 as described with reference to FIG. 14.

At 1915, the method may include transmitting an indication of a scheduled message, an uplink repetition sequence, or both associated with the first TRP and the second TRP, where communicating with the UE is based on the uplink repetition sequence. The operations of 1915 may be performed in accordance with examples as disclosed herein. In some examples, aspects of the operations of 1915 may be performed by a scheduling indication component 1445 as described with reference to FIG. 14.

At 1920, the method may include communicating with the UE via at least one of the first TRP or the second TRP in accordance with the first dedicated TDD pattern, the second dedicated TDD pattern, or both. The operations of 1920 may be performed in accordance with examples as disclosed herein. In some examples, aspects of the operations of 1920 may be performed by an TRP communication component 1435 as described with reference to FIG. 14.

The following provides an overview of aspects of the present disclosure:

Aspect 1: A method for wireless communications at a UE, comprising: receiving control information indicative of a plurality of time division duplexing patterns, wherein a first dedicated time division duplexing pattern of the plurality of time division duplexing patterns is for time division duplexing communications between the UE and a first transmission and reception point from a set of multiple transmission and reception points associated with a network entity; determining at least a second dedicated time division duplexing pattern for time division duplexing communications between the UE and at least a second transmission and reception point from the set of multiple transmission and reception points based at least in part on the plurality of time division duplexing patterns; and communicating with the network entity via at least one of the first transmission and reception point or the second transmission and reception point in accordance with the first dedicated time division duplexing pattern, the second dedicated time division duplexing pattern, or both.

Aspect 2: The method of aspect 1, further comprising: receiving additional control information indicative of an allocation of frequency resources for one or more slots; and determining one or more frequency-specific time division duplexing patterns for the communicating with the network entity, wherein the one or more frequency-specific time division duplexing patterns are based on the additional control information and at least one of the first dedicated time division duplexing pattern or the second dedicated time division duplexing pattern.

Aspect 3: The method of aspect 2, wherein the additional control information is indicative of whether a slot is configured for half-duplex communications, full duplex communications in which multiple transmission and reception points are allocated a same set of frequency resources, sub-band full duplex communications, or whether there is partial overlap of uplink resources and downlink resources in an in-band full-duplex slot.

Aspect 4: The method of any of aspects 2 through 3, wherein the additional control information indicates a first allocation of frequency resources from a set of allocations of frequency resources.

Aspect 5: The method of any of aspects 1 through 4, wherein communicating with the network entity further comprises: receiving one or more first messages from the first transmission and reception point in a full-duplex slot in accordance with the first dedicated time division duplexing pattern; and transmitting, simultaneously with receiving the one or more first messages, one or more second messages to the second transmission and reception point in the full-duplex slot in accordance with the second dedicated time division duplexing pattern.

Aspect 6: The method of any of aspects 1 through 5, further comprising: identifying a first set of communication parameters associated with the first dedicated time division duplexing pattern and a second set of communication parameters associated with the second dedicated time division duplexing pattern; and communicating via the first transmission and reception point and the second transmission and reception point by switching between the first set of communication parameters and the second set of communication parameters in accordance with the respective first dedicated time division duplexing pattern and the second dedicated time division duplexing pattern.

Aspect 7: The method of aspect 6, wherein the first set of communication parameters and the second set of communication parameters each comprise a transmission configuration indicator state, a control resource set pool index, one or more beam control parameters, one or more power control parameters, one or more timing advance parameters, or a combination thereof.

Aspect 8: The method of any of aspects 1 through 7, further comprising: receiving an indication of an uplink repetition sequence associated with the first transmission and reception point and the second transmission and reception point, wherein communicating with the network entity is based at least in part on the uplink repetition sequence.

Aspect 9: The method of aspect 8, further comprising: identifying that the uplink repetition sequence aligns with the first dedicated time division duplexing pattern and the second dedicated time division duplexing pattern, wherein the UE communicates with the network entity in accordance with the uplink repetition sequence, the first dedicated time division duplexing pattern, and the second dedicated time division duplexing pattern.

Aspect 10: The method of any of aspects 8 through 9, further comprising: identifying that one or more repetitions of the uplink repetition sequence fail to align with the first dedicated time division duplexing pattern, the second dedicated time division duplexing pattern, or both.

Aspect 11: The method of aspect 10, further comprising: refraining to transmit the one or more repetitions of the uplink repetition sequence based on the one or more repetitions failing to align with the first dedicated time division duplexing pattern, the second dedicated time division duplexing pattern, or both.

Aspect 12: The method of any of aspects 10 through 11, further comprising: transmitting the one or more repetitions of the uplink repetition sequence irrespective of the one or more repetitions failing to align with the first dedicated time division duplexing pattern, the second dedicated time division duplexing pattern, or both.

Aspect 13: The method of any of aspects 8 through 12, wherein the uplink repetition sequence indicates a number of repetitions of an uplink message in accordance with a cyclic mapping, or a sequential mapping, repetitions of the uplink repetition sequence alternate between the first transmission and reception point and the second transmission and reception point.

Aspect 14: The method of any of aspects 1 through 13, further comprising: performing slot counting for the first transmission and reception point, the second transmission and reception point, or both based at least in part on a common time division duplexing pattern of the plurality of time division duplexing patterns for time division duplexing communications associated with the network entity.

Aspect 15: The method of aspect 14, further comprising: identifying a scheduling conflict between one or more scheduled messages and the first dedicated time division duplexing pattern based at least in part on the slot counting.

Aspect 16: The method of aspect 15, further comprising: refraining to transmit the one or more scheduled messages based at least in part on the scheduling conflict.

Aspect 17: The method of any of aspects 15 through 16, further comprising: transmitting the one or more scheduled messages irrespective of the scheduling conflict.

Aspect 18: The method of any of aspects 1 through 17, further comprising: performing slot counting for the first transmission and reception point, the second transmission and reception point, or both based at least in part on a respective dedicated time division duplexing patterns associated with each of the first and second transmission and reception points.

Aspect 19: The method of any of aspects 1 through 18, wherein the plurality of time division duplexing patterns comprises the second dedicated time division duplexing pattern for communications between the UE and at least the second transmission and reception point, and determining at least the second dedicated time division duplexing pattern is based at least in part on receiving the control information indicative of the second dedicated time division duplexing pattern.

Aspect 20: The method of any of aspects 1 through 19, wherein the plurality of time division duplexing patterns comprises a common time division duplexing pattern for time division duplexing communications associated with the network entity.

Aspect 21: The method of aspect 20, wherein determining the second dedicated time division duplexing pattern further comprises: determining the second dedicated time division duplexing pattern based at least in part on the first dedicated time division duplexing pattern and the common time division duplexing pattern.

Aspect 22: The method of any of aspects 1 through 21, wherein each time division duplexing pattern of the plurality of time division duplexing patterns comprises one or more full-duplexing slots, one or more half-duplexing slots, or a both.

Aspect 23: The method of any of aspects 1 through 22, wherein communicating with the network entity further comprises: receiving one or more messages from the first transmission and reception point, the second transmission and reception point, or both in a half-duplex downlink slot, or a full-duplex slot in accordance with the plurality of time division duplexing patterns.

Aspect 24: The method of any of aspects 1 through 23, wherein communicating with the network entity further comprises: transmitting one or more messages to the first transmission and reception point, the second transmission and reception point, or both in a half-duplex uplink slot, or a full-duplex slot in accordance with the plurality of time division duplexing patterns.

Aspect 25: The method of any of aspects 1 through 24, further comprising: receiving a first downlink control information message indicative of scheduling information for the first transmission and reception point; and receiving a second downlink control information message indicative of scheduling information for the second transmission and reception point, wherein communicating with the network entity is based at least in part on receiving the first downlink control information message and the second downlink control information message.

Aspect 26: The method of any of aspects 1 through 25, further comprising: receiving a single downlink control information message indicative of scheduling information for the first transmission and reception point and the second transmission and reception point, wherein communicating with the network entity is based at least in part on receiving the single downlink control information message.

Aspect 27: A method for wireless communications at a network entity, comprising: identifying at least a first dedicated time division duplexing pattern for time division duplexing communications between a UE and a first transmission and reception point from a set of multiple transmission and reception points associated with the network entity and a second dedicated time division duplexing pattern for time division duplexing communications between the UE and a second transmission and reception point from the set of multiple transmission and reception points associated with the network entity; transmitting control information indicative of a plurality of time division duplexing patterns, wherein the plurality of time division duplexing patterns comprises at least the first dedicated time division duplexing pattern; and communicating with the UE via at least one of the first transmission and reception point or the second transmission and reception point in accordance with the first dedicated time division duplexing pattern, the second dedicated time division duplexing pattern, or both.

Aspect 28: The method of aspect 27, further comprising: transmitting additional control information indicative of an allocation of frequency resources for one or more slots; and determining one or more frequency-specific time division duplexing patterns for the communicating with the UE, wherein the one or more frequency-specific time division duplexing patterns are based on the additional control information and at least one of the first dedicated time division duplexing pattern or the second dedicated time division duplexing pattern.

Aspect 29: The method of aspect 28, wherein the additional control information is indicative of whether a slot is configured for half-duplex communications, full duplex communications in which multiple transmission and reception points are allocated a same set of frequency resources, sub-band full duplex communications, or whether there is partial overlap of uplink resources and downlink resources in an in-band full-duplex slot.

Aspect 30: The method of any of aspects 28 through 29, wherein the additional control information indicates a first allocation of frequency resources from a set of allocations of frequency resources.

Aspect 31: The method of any of aspects 27 through 30, wherein communicating with the UE further comprises: transmitting one or more first messages via the first transmission and reception point in a full-duplex slot in accordance with the first dedicated time division duplexing pattern; and receiving, simultaneously to transmitting the one or more first messages, one or more second messages via the second transmission and reception point in the full-duplex slot in accordance with the second dedicated time division duplexing pattern.

Aspect 32: The method of any of aspects 27 through 31, further comprising: transmitting an indication of a scheduled message, an uplink repetition sequence, or both associated with the first transmission and reception point and the second transmission and reception point, wherein communicating with the UE is based at least in part on the uplink repetition sequence.

Aspect 33: The method of aspect 32, further comprising: configuring the scheduled message, the uplink repetition sequence, or both such that the scheduled message, the uplink repetition sequence, or both aligns with the first dedicated time division duplexing pattern and the second dedicated time division duplexing pattern.

Aspect 34: The method of any of aspects 32 through 33, further comprising: identifying a failure to receive the scheduled message, one or more repetitions of the uplink repetition sequence, or both, wherein the failure is based at least in part on the scheduled message, the one or more repetitions of the uplink repetition sequence, or both failing to align with the first dedicated time division duplexing pattern, the second dedicated time division duplexing pattern, or both.

Aspect 35: The method of any of aspects 32 through 34, further comprising: receiving the scheduled message, a set of repetitions in accordance with the uplink repetition sequence, or both, wherein the scheduled message, one or more repetitions of the set of repetitions, or both fail to align with the first dedicated time division duplexing pattern, the second dedicated time division duplexing pattern, or both.

Aspect 36: The method of any of aspects 32 through 35, wherein the uplink repetition sequence indicates a number of repetitions of an uplink message in accordance with a cyclic mapping, or a sequential mapping, repetitions of the uplink repetition sequence alternate between the first transmission and reception point and the second transmission and reception point.

Aspect 37: The method of any of aspects 27 through 36, wherein the plurality of time division duplexing patterns comprises the second dedicated time division duplexing pattern for communications between the UE and at least the second transmission and reception point.

Aspect 38: The method of any of aspects 27 through 37, wherein the plurality of time division duplexing patterns comprises a common time division duplexing pattern for time division duplexing communications associated with the network entity.

Aspect 39: The method of any of aspects 27 through 38, wherein each time division duplexing pattern of the plurality of time division duplexing patterns comprises one or more full-duplexing slots, one or more half-duplexing slots, or a both.

Aspect 40: The method of any of aspects 27 through 39, wherein communicating with the UE further comprises: transmitting one or more messages via the first transmission and reception point, the second transmission and reception point, or both in a half-duplex downlink slot, or a full-duplex slot in accordance with the plurality of time division duplexing patterns.

Aspect 41: The method of any of aspects 27 through 40, wherein communicating with the UE further comprises: receiving one or more messages via the first transmission and reception point, the second transmission and reception point, or both in a half-duplex uplink slot, or a full-duplex slot in accordance with the plurality of time division duplexing patterns.

Aspect 42: The method of any of aspects 27 through 41, further comprising: transmitting a first downlink control information message indicative of scheduling information for the first transmission and reception point; and transmitting a second downlink control information message indicative of scheduling information for the second transmission and reception point, wherein communicating with the UE is based at least in part on transmitting the first downlink control information message and the second downlink control information message.

Aspect 43: The method of any of aspects 27 through 42, further comprising: transmitting a single downlink control information message indicative of scheduling information for the first transmission and reception point and the second transmission and reception point, wherein communicating with the UE is based at least in part on transmitting the single downlink control information message.

Aspect 44: An apparatus for wireless communications at a UE, comprising at least one processor; and memory coupled with the at least one processor, the memory storing instructions executable by the at least one processor to cause the UE to perform a method of any of aspects 1 through 26.

Aspect 45: An apparatus for wireless communications at a UE, comprising at least one means for performing a method of any of aspects 1 through 26.

Aspect 46: A non-transitory computer-readable medium storing code for wireless communications at a UE, the code comprising instructions executable by at least one processor to perform a method of any of aspects 1 through 26.

Aspect 47: An apparatus for wireless communications at a network entity, comprising at least one processor; and memory coupled with the at least one processor, the memory storing instructions executable by the at least one processor to cause the network entity to perform a method of any of aspects 27 through 43.

Aspect 48: An apparatus for wireless communications at a network entity, comprising at least one means for performing a method of any of aspects 27 through 43.

Aspect 49: A non-transitory computer-readable medium storing code for wireless communications at a network entity, the code comprising instructions executable by at least one processor to perform a method of any of aspects 27 through 43.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies, including future systems and radio technologies, not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, a GPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, code (e.g., software) executed by a processor, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, phase change memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on." As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:
    receiving control information indicative of a plurality of time division duplexing patterns, wherein a first dedicated time division duplexing pattern of the plurality of time division duplexing patterns is for time division duplexing communications between the UE and a first transmission and reception point from a set of multiple transmission and reception points associated with a network entity;
    determining at least a second dedicated time division duplexing pattern for time division duplexing communications between the UE and at least a second transmission and reception point from the set of multiple transmission and reception points based at least in part on the first dedicated time division duplexing pattern and a common time division duplexing pattern of the plurality of time division duplexing patterns; and
    communicating with the network entity via the first transmission and reception point in accordance with the first dedicated time division duplexing pattern and concurrently via the second transmission and reception point in accordance with the second dedicated time division duplexing pattern.

2. The method of claim 1, further comprising:
    receiving additional control information indicative of an allocation of frequency resources for one or more slots; and
    determining one or more frequency-specific time division duplexing patterns for the communicating with the network entity, wherein the one or more frequency-specific time division duplexing patterns are based on the additional control information and at least one of the first dedicated time division duplexing pattern or the second dedicated time division duplexing pattern.

3. The method of claim 1, further comprising:
    identifying a first set of communication parameters associated with the first dedicated time division duplexing pattern and a second set of communication parameters associated with the second dedicated time division duplexing pattern; and
    communicating via the first transmission and reception point and the second transmission and reception point by switching between the first set of communication parameters and the second set of communication parameters in accordance with the respective first dedicated time division duplexing pattern and the second dedicated time division duplexing pattern.

4. The method of claim 1, further comprising:
    receiving an indication of an uplink repetition sequence associated with the first transmission and reception point and the second transmission and reception point, wherein communicating with the network entity is based at least in part on the uplink repetition sequence.

5. The method of claim 4, further comprising:
    identifying that the uplink repetition sequence aligns with the first dedicated time division duplexing pattern and the second dedicated time division duplexing pattern, wherein the UE communicates with the network entity in accordance with the uplink repetition sequence, the first dedicated time division duplexing pattern, and the second dedicated time division duplexing pattern.

6. The method of claim 4, further comprising:
    identifying that one or more repetitions of the uplink repetition sequence fail to align with the first dedicated time division duplexing pattern, the second dedicated time division duplexing pattern, or both.

7. The method of claim 6, further comprising:
    refraining to transmit the one or more repetitions of the uplink repetition sequence based on the one or more repetitions failing to align with the first dedicated time division duplexing pattern, the second dedicated time division duplexing pattern, or both.

8. The method of claim 6, further comprising:
    transmitting the one or more repetitions of the uplink repetition sequence irrespective of the one or more repetitions failing to align with the first dedicated time division duplexing pattern, the second dedicated time division duplexing pattern, or both.

9. The method of claim 1, further comprising:
    performing slot counting for the first transmission and reception point, the second transmission and reception point, or both based at least in part on the common time division duplexing pattern of the plurality of time division duplexing patterns for time division duplexing communications associated with the network entity.

10. The method of claim 9, further comprising:
    identifying a scheduling conflict between one or more scheduled messages and the first dedicated time division duplexing pattern based at least in part on the slot counting.

11. The method of claim 10, further comprising:
    refraining to transmit the one or more scheduled messages based at least in part on the scheduling conflict.

12. The method of claim 10, further comprising:
    transmitting the one or more scheduled messages irrespective of the scheduling conflict.

13. The method of claim 1, further comprising:
    performing slot counting for the first transmission and reception point, the second transmission and reception point, or both based at least in part on a respective dedicated time division duplexing patterns associated with each of the first transmission and reception point and the second transmission and reception point.

14. The method of claim 1, wherein:
the plurality of time division duplexing patterns comprises the second dedicated time division duplexing pattern for communications between the UE and at least the second transmission and reception point, and
determining at least the second dedicated time division duplexing pattern is based at least in part on receiving the control information indicative of the second dedicated time division duplexing pattern.

15. A method for wireless communications at a network entity, comprising:
identifying at least a first dedicated time division duplexing pattern for time division duplexing communications between a user equipment (UE) and a first transmission and reception point from a set of multiple transmission and reception points associated with the network entity and a second dedicated time division duplexing pattern for time division duplexing communications between the UE and a second transmission and reception point from the set of multiple transmission and reception points associated with the network entity, the second dedicated time division duplexing pattern based at least in part on the first dedicated time division duplexing pattern and a common time division duplexing pattern;
transmitting control information indicative of a plurality of time division duplexing patterns, wherein the plurality of time division duplexing patterns comprises at least the first dedicated time division duplexing pattern and the common time division duplexing pattern; and
communicating with the UE via the first transmission and reception point in accordance with the first dedicated time division duplexing pattern and concurrently via the second transmission and reception point in accordance with the second dedicated time division duplexing pattern.

16. The method of claim 15, further comprising:
transmitting additional control information indicative of an allocation of frequency resources for one or more slots; and
determining one or more frequency-specific time division duplexing patterns for the communicating with the UE, wherein the one or more frequency-specific time division duplexing patterns are based on the additional control information and at least one of the first dedicated time division duplexing pattern or the second dedicated time division duplexing pattern.

17. An apparatus for wireless communications at a user equipment (UE), comprising:
at least one processor; and
memory coupled with the at least one processor, the memory storing instructions executable by the at least one processor to cause the UE to:
receive control information indicative of a plurality of time division duplexing patterns, wherein a first dedicated time division duplexing pattern of the plurality of time division duplexing patterns is for time division duplexing communications between the UE and a first transmission and reception point from a set of multiple transmission and reception points associated with a network entity;
determine at least a second dedicated time division duplexing pattern for time division duplexing communications between the UE and at least a second transmission and reception point from the set of multiple transmission and reception points based at least in part on the first dedicated time division duplexing pattern and a common time division duplexing pattern of the plurality of time division duplexing patterns; and
communicate with the network entity via the first transmission and reception point in accordance with the first dedicated time division duplexing pattern and concurrently via the second transmission and reception point in accordance with the second dedicated time division duplexing pattern.

18. The apparatus of claim 17, wherein the instructions are further executable by the at least one processor to cause the UE to:
receive additional control information indicative of an allocation of frequency resources for one or more slots; and
determine one or more frequency-specific time division duplexing patterns for the communicating with the network entity, wherein the one or more frequency-specific time division duplexing patterns are based on the additional control information and at least one of the first dedicated time division duplexing pattern or the second dedicated time division duplexing pattern.

19. The apparatus of claim 17, wherein the instructions are further executable by the at least one processor to cause the UE to:
identify a first set of communication parameters associated with the first dedicated time division duplexing pattern and a second set of communication parameters associated with the second dedicated time division duplexing pattern; and
communicate via the first transmission and reception point and the second transmission and reception point by switching between the first set of communication parameters and the second set of communication parameters in accordance with the respective first dedicated time division duplexing pattern and the second dedicated time division duplexing pattern.

20. The apparatus of claim 17, wherein the instructions are further executable by the at least one processor to cause the UE to:
receive an indication of an uplink repetition sequence associated with the first transmission and reception point and the second transmission and reception point, wherein communicating with the network entity is based at least in part on the uplink repetition sequence.

21. The apparatus of claim 20, wherein the instructions are further executable by the at least one processor to cause the UE to:
identify that the uplink repetition sequence aligns with the first dedicated time division duplexing pattern and the second dedicated time division duplexing pattern, wherein the UE communicates with the network entity in accordance with the uplink repetition sequence, the first dedicated time division duplexing pattern, and the second dedicated time division duplexing pattern.

22. The apparatus of claim 20, wherein the instructions are further executable by the at least one processor to cause the UE to:
identify that one or more repetitions of the uplink repetition sequence fail to align with the first dedicated time division duplexing pattern, the second dedicated time division duplexing pattern, or both.

23. The apparatus of claim 22, wherein the instructions are further executable by the at least one processor to cause the UE to:
  refrain to transmit the one or more repetitions of the uplink repetition sequence based on the one or more repetitions failing to align with the first dedicated time division duplexing pattern, the second dedicated time division duplexing pattern, or both.

24. The apparatus of claim 22, wherein the instructions are further executable by the at least one processor to cause the UE to:
  transmit the one or more repetitions of the uplink repetition sequence irrespective of the one or more repetitions failing to align with the first dedicated time division duplexing pattern, the second dedicated time division duplexing pattern, or both.

25. The apparatus of claim 17, wherein the instructions are further executable by the at least one processor to cause the UE to:
  perform slot counting for the first transmission and reception point, the second transmission and reception point, or both based at least in part on the common time division duplexing pattern of the plurality of time division duplexing patterns for time division duplexing communications associated with the network entity.

26. The apparatus of claim 25, wherein the instructions are further executable by the at least one processor to cause the UE to:
  identify a scheduling conflict between one or more scheduled messages and the first dedicated time division duplexing pattern based at least in part on the slot counting.

27. The apparatus of claim 26, wherein the instructions are further executable by the at least one processor to cause the UE to:
  refrain to transmit the one or more scheduled messages based at least in part on the scheduling conflict.

28. The apparatus of claim 26, wherein the instructions are further executable by the at least one processor to cause the UE to:
  transmit the one or more scheduled messages irrespective of the scheduling conflict.

29. The apparatus of claim 17, wherein the instructions are further executable by the at least one processor to cause the UE to:
  perform slot counting for the first transmission and reception point, the second transmission and reception point, or both based at least in part on a respective dedicated time division duplexing patterns associated with each of the first transmission and reception point and the second transmission and reception point.

30. An apparatus for wireless communications at a network entity, comprising:
  at least one processor; and
  memory coupled with the at least one processor, the memory storing instructions executable by the at least one processor to cause the network entity to:
    identify at least a first dedicated time division duplexing pattern for time division duplexing communications between a user equipment (UE) and a first transmission and reception point from a set of multiple transmission and reception points associated with the network entity and a second dedicated time division duplexing pattern for time division duplexing communications between the UE and a second transmission and reception point from the set of multiple transmission and reception points associated with the network entity, the second dedicated time division duplexing pattern based at least in part on the first dedicated time division duplexing pattern and a common time division duplexing pattern;
    transmit control information indicative of a plurality of time division duplexing patterns, wherein the plurality of time division duplexing patterns comprises at least the first dedicated time division duplexing pattern and the common time division duplexing pattern; and
    communicate with the UE via the first transmission and reception point in accordance with the first dedicated time division duplexing pattern and concurrently via the second transmission and reception point in accordance with the second dedicated time division duplexing pattern.

* * * * *